(12) United States Patent
Nagumo

(10) Patent No.: US 8,451,306 B2
(45) Date of Patent: May 28, 2013

(54) REFERENCE VOLTAGE GENERATION CIRCUIT, DRIVE DEVICE, PRINT HEAD, AND IMAGE FORMING APPARATUS

(75) Inventor: Akira Nagumo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 68 days.

(21) Appl. No.: 13/091,601

(22) Filed: Apr. 21, 2011

(65) Prior Publication Data

US 2011/0261138 A1    Oct. 27, 2011

(30) Foreign Application Priority Data

Apr. 23, 2010  (JP) ................................. 2010-100209

(51) Int. Cl.
*B41J 2/435* (2006.01)
*B41J 2/47* (2006.01)

(52) U.S. Cl.
USPC .......................................... 347/237; 347/246

(58) Field of Classification Search
USPC .......... 347/226, 237, 238, 247; 323/311–317; 327/427, 431, 432, 512, 513
See application file for complete search history.

(56) References Cited

U.S. PATENT DOCUMENTS

| | | | | |
|---|---|---|---|---|
| 6,002,243 A | * | 12/1999 | Marshall | 323/313 |
| 6,028,475 A | * | 2/2000 | Kikuchi | 329/304 |
| 6,956,397 B2 | * | 10/2005 | Lim et al. | 326/31 |
| 7,511,567 B2 | * | 3/2009 | Yeo et al. | 327/539 |

FOREIGN PATENT DOCUMENTS

| JP | 10-332494 A | 12/1998 |
|---|---|---|
| JP | 11-258065 A | 9/1999 |
| JP | 2000-075947 A | 3/2000 |
| JP | 2000-108407 A | 4/2000 |
| JP | 2003-078366 A | 3/2003 |

* cited by examiner

*Primary Examiner* — Hai C Pham
(74) *Attorney, Agent, or Firm* — Kubotera & Associates LLC

(57) ABSTRACT

A reference voltage generation circuit includes a first current-mirror circuit including a first MOS transistor connected to a first power source and a second MOS transistor of the first conductive type connected to the first power source; a second current-mirror circuit including a third MOS transistor and a fourth MOS transistor; a first resistor connected to the first node; a first bipolar transistor having a collector connected to the first resistor, an emitter connected to a second power source, and a base connected to the first node; a second bipolar transistor having a collector connected to the second node, an emitter connected to the second power source, and a base connected to the first bipolar transistor; a fifth MOS transistor connected between the first power source and an output terminal; and a third resistor connected between the output terminal and the second power source.

9 Claims, 14 Drawing Sheets

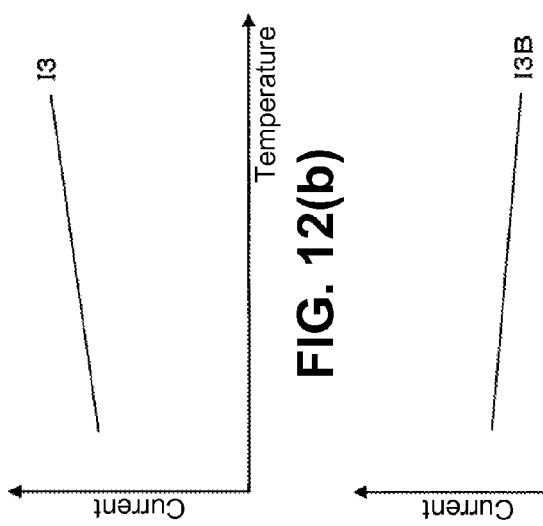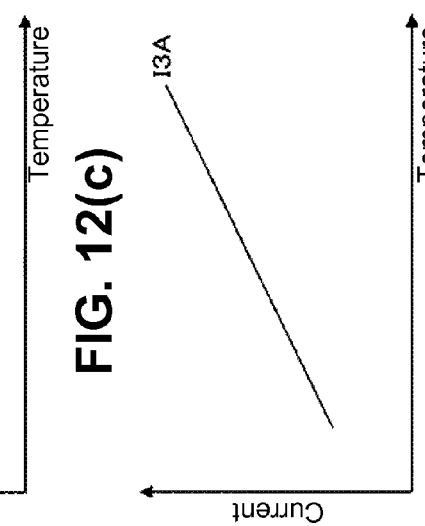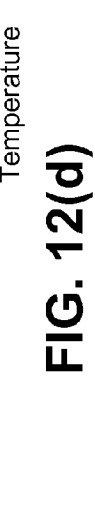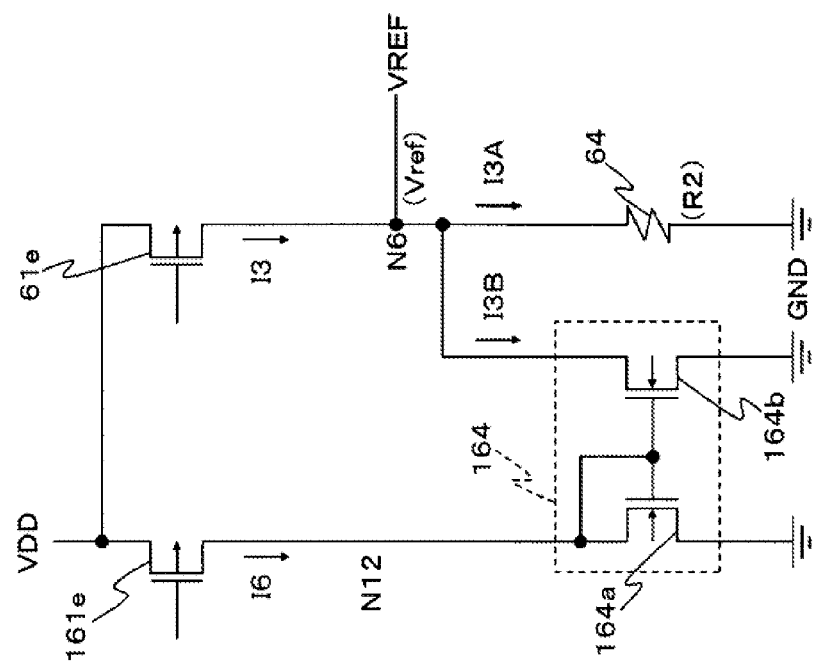

REFERENCE VOLTAGE GENERATION CIRCUIT, DRIVE DEVICE, PRINT HEAD, AND IMAGE FORMING APPARATUS

BACKGROUND OF THE INVENTION AND RELATED ART STATEMENT

The present invention relates to a reference voltage generation circuit for generating a reference voltage to selectively and cyclically drive a group of driven elements such as, for example, an array of light emitting elements disposed in an electro-photography printer, an array of heating resistors disposed in a thermal printer, and an array of display units disposed in a display device. The present invention also relates to a drive device including the reference voltage generation circuit; a print head including the drive circuit; and an image forming apparatus including the print head.

In a conventional image forming apparatus such as an electro-photography printer, a plurality of light emitting elements is arranged to form an exposure device. The light emitting element includes an organic electro luminescence element (referred to as an organic EL) and a light emitting thyristor, in addition to a light emitting diode (referred to as LED).

In general, the light emitting element as the driven element exhibits temperature dependence, and a luminescence output thereof tends to decrease with an increase in a temperature. In the conventional image forming apparatus such as the electro-photography printer, when the luminescence output of the light emitting element decreases, a print density varies, thereby causing a printing problem. To this end, it is configured such that a drive current for driving the light emitting element increases, thereby making it possible to compensate the decrease in the luminescence output of the light emitting element due to the increase in the temperature when the light emitting element is driven.

In the configuration, a drive device is provided with a reference voltage Vref, so that the drive current of the light emitting element is set reversely proportional to the reference voltage Vref. Further, the reference voltage Vref is provided with a positive temperature coefficient, so that is it possible to compensate the decrease in the luminescence output according to the temperature. Patent Reference has disclosed a conventional reference voltage generation circuit for generating an output voltage as the reference voltage Vref reversely proportional to the absolute temperature.

Patent Reference: Japanese Patent Publication No. 10-332494

When the drive device, the print head, and the image forming apparatus are provided with the conventional reference voltage generation circuit disclosed in Patent Reference, there have been the following problems.

In the print head, a large number of the light emitting elements are arranged. Accordingly, it is necessary to drive a large number of the light emitting elements. As a result, it is necessary to generate a large power source current for driving the light emitting elements, thereby causing a large variance in a power source voltage. Even when the light emitting elements are driven and the power source voltage drops significantly, it is still necessary to maintain a luminescence output of the light emitting elements at a specific level. To this end, it is necessary to design the drive device and a peripheral circuit thereof such that an influence of the large variance in the power source voltage is minimized.

In the conventional reference voltage generation circuit disclosed in Patent Reference, a pair of bipolar transistors is provided for detecting a temperature. The bipolar transistors have a characteristic in which a difference in voltages between a base and an emitter of the bipolar transistors varies according to a temperature. Accordingly, the conventional reference voltage generation circuit is configured such that the difference in the voltages is output as the reference voltage. When the power voltage decreases, the reference voltage tends to decrease. As a result, the drive current varies, thereby causing a variance in a print density.

In view of the problems described above, an object of the present invention is to provide a reference voltage generation circuit capable of solving the problems of the conventional reference voltage generation circuit. A further object of the present invention is to provide a drive device including the reference voltage generation circuit, a print head including the drive circuit, and an image forming apparatus including the print head.

Further objects and advantages of the invention will be apparent from the following description of the invention.

SUMMARY OF THE INVENTION

In order to attain the objects described above, according to a first aspect of the present invention, a reference voltage generation circuit includes a first current-mirror circuit including a first MOS transistor of a first conductive type connected to a first power source and a second MOS transistor of the first conductive type connected to the first power source; and a second current-mirror circuit including a third MOS transistor of a second conductive type and a fourth MOS transistor of the second conductive type. Further, the second current-mirror circuit is disposed between the first current-mirror circuit, and a first node and a second node, and is vertically connected to the first current-mirror circuit.

According to the first aspect of the present invention, the reference voltage generation circuit further includes a first resistor having one end portion connected to the first node; a first bipolar transistor having a collector connected to the other end portion of the first resistor, an emitter connected to a second power source having a potential different from that of the first power source, and a base connected to the first node; a second bipolar transistor having a collector directly connected to the second node or connected to the second node through a second resistor, an emitter connected to the second power source, and a base connected to the collector of the first bipolar transistor; a fifth MOS transistor connected between the first power source and an output terminal for outputting a reference voltage so that a conductive state of the fifth MOS transistor is controlled according to an output voltage of the first current-mirror circuit; and a third resistor connected in series between the output terminal and the second power source.

According to a second aspect of the present invention, the reference voltage generation circuit in the first aspect of the present invention may further include a sixth MOS transistor of the second conductive type. The sixth MOS transistor is connected between the fifth MOS transistor and the output terminal through a diode connection.

According to a third aspect of the present invention, the reference voltage generation circuit in the first aspect of the present invention may further include a third current-mirror circuit including a seventh MOS transistor of the first conductive type connected to the first power source and an eighth MOS transistor of the first conductive type connected to the first power source; and a fourth current-mirror circuit including a ninth MOS transistor of the second conductive type and a tenth MOS transistor of the second conductive type. The second current-mirror circuit is disposed between the third current-mirror circuit, and a third node and a fourth node, and is vertically connected to the third current-mirror circuit.

According to the third aspect of the present invention, the reference voltage generation circuit in the first aspect of the present invention may further include a third bipolar transistor having a collector and a base connected to the third node and an emitter connected to the second power source; a fourth resistor connected in series between the fourth node and the second power source; an eleventh MOS transistor connected between the first power source and a fifth node so that a conductive state of the eleventh MOS transistor is controlled according to an output voltage of the third current-mirror circuit; and a fifth current-mirror circuit including a twelfth MOS transistor of the second conductive type disposed between the fifth node and the output terminal and connected in series to the eleventh MOS transistor, and a thirteenth MOS transistor of the second conductive type connected in parallel to the third resistor.

According to a fourth aspect of the present invention, the reference voltage generation circuit in the third aspect of the present invention may further include a fourteenth MOS transistor connected between the fifth MOS transistor and the output terminal through a diode connection, and a fifteenth MOS transistor connected between the eleventh MOS transistor and the fifth node through a diode connection.

According to a fifth aspect of the present invention, a drive device may include the reference voltage generation circuit in one of the first aspect to the fourth aspect of the present invention; and a control voltage generation circuit for receiving a reference voltage output from the reference voltage generation circuit to generate a control voltage according to the reference voltage.

According to the fifth aspect of the present invention, the drive device may further include a logic circuit having a power source terminal for receiving a power source voltage output from the first power source, and a ground terminal for receiving the control voltage. The logic circuit is provided for receiving a strobe signal and data, so that the logic circuit controls output of the data according to the strobe signal, and outputs a voltage with a high level substantially equal to the power source voltage or a voltage with a low level substantially equal to the control voltage. Further, the drive device may include a drive circuit for receiving the power source voltage, and supplying a drive current to a driven element according to an output voltage of the logic circuit.

According to a sixth aspect of the present invention, a print head may include the drive device in the fifth aspect of the present invention and a light emitting element array for emitting light according to the drive current. In the light emitting element array, a plurality of light emitting elements is arranged as the driven element.

According to a seventh aspect of the present invention, an image forming apparatus may include the print head in the fifth aspect of the present invention, so that the print head exposes to form an image on a recording medium.

In the reference voltage generation circuit in the first aspect and the second aspect of the present invention, a current-mirror circuit portion is formed of the first current-mirror circuit and the second current-mirror circuit, and is provided for driving the first bipolar transistor and the second bipolar transistor. Accordingly, it is possible to provide the first node and the second node with a substantially equal potential. As a result, even when the power voltage of the first power source varies, it is possible to minimize a variance in a collector potential of the second bipolar transistor, thereby reducing a variance in the reference voltage generated from the reference voltage generation circuit to a minimum level.

In the reference voltage generation circuit in the third aspect and the fourth aspect of the present invention, in addition to the configuration of the reference voltage generation circuit in the first aspect and the second aspect of the present invention, there are provided the third current-mirror circuit, the fourth current-mirror circuit, and the fifth current-mirror circuit. Accordingly, the reference voltage is generated substantially proportional to a voltage between the base and the emitter of the first bipolar transistor and the second bipolar transistor.

Further, in the reference voltage generation circuit in the third aspect and the fourth aspect of the present invention, the reference voltage is subtracted from the reference voltage generated in the reference voltage generation circuit in the first aspect and the second aspect of the present invention. Accordingly, it is possible to generate the reference voltage with a large temperature coefficient, thereby generating the reference voltage at a desired level. As a result, it is possible to set the temperature coefficient of the reference voltage at a desired level. Further, it is possible to set a voltage value at a desired level independently from the temperature coefficient. Further, similar to the first aspect and the second aspect of the present invention, even when the power voltage of the first power source varies, it is possible to reduce the variance in the reference voltage generated from the reference voltage generation circuit to a minimum level.

In the fifth aspect and the sixth aspect of the present invention, the drive device and the print head include the reference voltage generation circuit in one of the first aspect to the fourth aspect of the present invention. Accordingly, it is possible to stably drive the driven element without being subject to an influence of the variance in the power source voltage or the temperature.

In the seventh aspect of the present invention, the image forming apparatus includes the print head having the reference voltage generation circuit in one of the first aspect to the fourth aspect of the present invention. Accordingly, it is possible to provide the image forming apparatus with high quality, excellent space efficiency, and excellent light output efficiency.

BRIEF DESCRIPTION OF THE DRAWINGS

FIGS. 8(a) and 8(b) are graphs showing characteristics of a reference voltage Vref generated from the voltage generation circuit shown in FIG. 5, wherein FIG. 8(a) is a graph showing a relationship between the reference voltage Vref and a power source voltage VDD, and FIG. 8(b) is a graph showing a relationship between a power source voltage VDD dependence coefficient and the power source voltage VDD;

FIGS. 9(a) and 9(b) are graphs showing characteristics of the reference voltage Vref generated from the voltage generation circuit shown in FIG. 1 according to the first embodiment of the present invention, wherein FIG. 9(a) is a graph showing a relationship between the reference voltage Vref and the power source voltage VDD, and FIG. 9(b) is a graph showing a relationship between the power source voltage VDD dependence coefficient and the power source voltage VDD;

FIGS. 12(a) to 12(d) are a circuit diagram and graphs showing an operation of the reference voltage generation circuit according to the third embodiment of the present invention, wherein FIG. 12 (a) is a circuit diagram showing a surrounding portion of a current-mirror circuit of the reference voltage generation circuit, FIG. 12(b) is a graph showing a relationship between a temperature and a current I3 flowing in the surrounding portion of the current-mirror circuit, FIG. 12(c) is a graph showing a relationship between a temperature and a current I3B flowing in the surrounding portion of the current-mirror circuit, and FIG. 12(d) is a graph showing a relationship between a temperature and a current I3A flowing in the surrounding portion of the current-mirror circuit;

FIGS. 13(a) and 13(b) are graphs showing characteristics of the voltage generation circuit according to the third embodiment of the present invention, wherein FIG. 13(a) is a graph No. 1 showing a relationship between a temperature coefficient and a current, and FIG. 13(b) is a graph No. 2 showing the relationship between the temperature coefficient and the current.

DETAILED DESCRIPTION OF PREFERRED EMBODIMENTS

Figure 1:
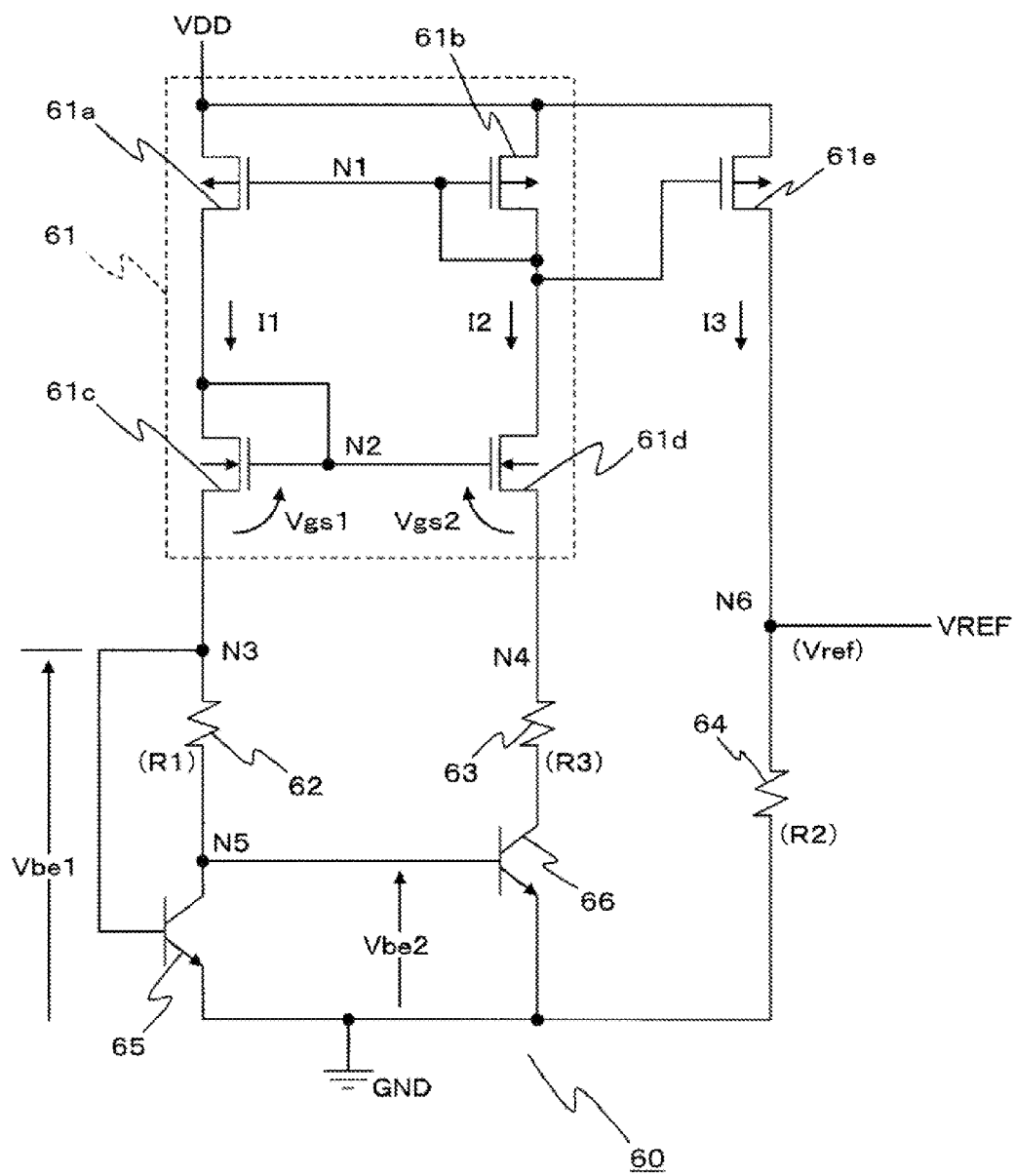
FIG. 1 is a circuit diagram showing a configuration of a reference voltage generation circuit according to a first embodiment of the present invention.

Hereunder, preferred embodiments of the present invention will be explained with reference to the accompanying drawings. Similar components in the drawings are designated with the same reference numerals. It is noted that the drawings are presented only for an explanation purpose, and the present invention is not limited thereto.

First Embodiment

Figure 2:
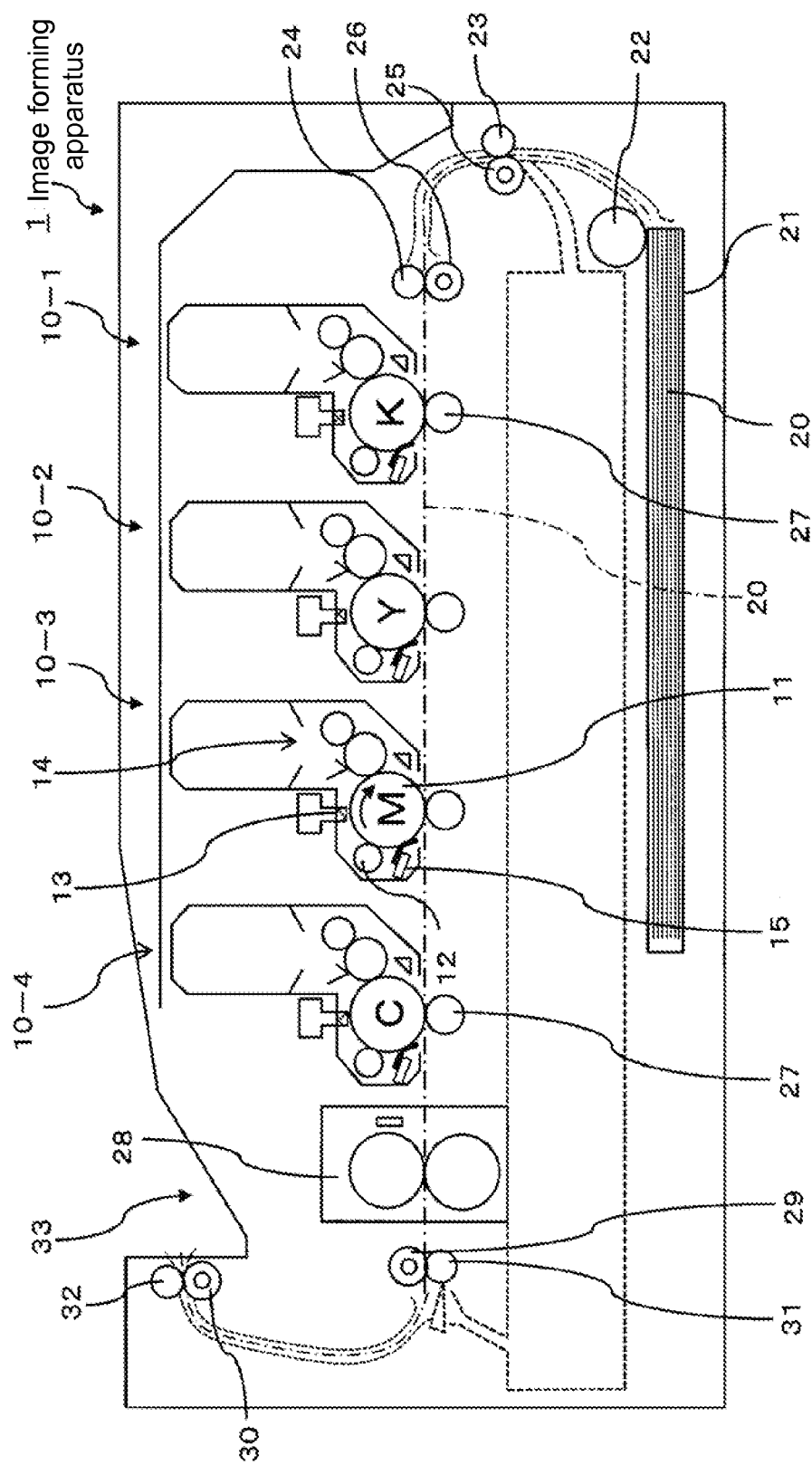
FIG. 2 is a schematic sectional view showing a configuration of an image forming apparatus according to the first embodiment of the present invention.

A first embodiment of the present invention will be explained. FIG. 2 is a schematic sectional view showing a configuration of an image forming apparatus 1 according to the first embodiment of the present invention.

In the embodiment, the image forming apparatus 1 is an electro-photography type color printer. In the electro-photography type color printer, print heads 13 using a light emitting element (for example, an LED) as a driven element are disposed.

As shown in FIG. 2, the image forming apparatus 1 includes four process units 10-1 to 10-4 for forming images in colors of black (K), yellow (Y), magenta (M), and cyan (C). The process units 10-1 to 10-4 are arranged from an upstream side in this order along a transportation path of a recording medium 20 (for example, a sheet). The process units 10-1 to 10-4 have an identical internal configuration, and an internal configuration of the process unit 10-3 for magenta will be explained in the following description as an example.

In the embodiment, a photosensitive member (for example, a photosensitive drum 11) as an image supporting member is disposed in the process unit 10-3 to be freely rotatable in an arrow direction in FIG. 2. There are provided around the photosensitive drum 11 in this order a charging device 12 for supplying electrons and charging a surface of the photosensitive drum 11 and an exposure device (for example, the print head 13) for selectively irradiating light on the surface of the photosensitive drum 11 to form a static latent image thereon.

In the embodiment, the process unit 10-3 further includes a developing device 14 for attaching toner in magenta (a specific color) to the surface of the photosensitive drum 11 with the static latent image formed thereon, so that a visualized image is formed on the photosensitive drum 11. Further, the process unit 10-3 includes a cleaning device 15 for removing remaining toner after the visualized image of toner on the photosensitive drum 11 is transferred to the recording medium 20. Each of the components described above includes a drum and/or a roller, and a drive source (not shown) transmits a drive force through a gear and the like to rotate the drum and/or the roller.

In the embodiment, a sheet cassette 21 is disposed at a lower portion of the image forming apparatus 1 for storing the recording medium 20 in a stacked state. A hopping roller 22 is disposed above the sheet cassette 21 for separating and transporting the recording medium 20 one by one. A pinch roller 23 and a transportation roller 25 are disposed on a downstream side of the hopping roller 22 in a transportation direction of the recording medium 20 for sandwiching and transporting the recording medium 20. Further, a pinch roller 24 and a register roller 26 are disposed on the downstream side of the hopping roller 22 in the transportation direction of the recording medium 20 for correcting a skew of the recording medium 20 and transporting the recording medium 20 to the process unit 10-1. A drive source (not shown) transmits a drive force through a gear and the like to rotate the transportation roller 25 and the register roller 26.

In the embodiment, a transfer device 27 is disposed at a position to face the photosensitive drum 11 in each of the process units 10-1 to 10-4. The transfer device 27 is formed of a semi-conductive rubber and the like. A voltage is applied to the transfer device 27. Accordingly, a potential difference is created between a surface potential of the photosensitive drum 11 and a surface potential of the transfer device 27, so that the visualized image of toner attached to the photosensitive drum 11 is transferred to the recording medium 20.

In the embodiment, the image forming apparatus 1 further includes a fixing device 28 on the downstream side of the process unit 10-4. The fixing device 28 includes a heating roller with a heater disposed therein and a backup roller, so that the fixing device 28 heats and presses toner transferred to the recording medium 20, so that the visualized image is fixed to the recording medium 20. Further, discharge rollers 29 and 30, pinch rollers 31 and 32 of a discharge portion, and a sheet stacker portion 33 are disposed on the downstream side of the fixing device 28.

After the recording medium 20 is discharged from the fixing device 28, the discharge rollers 29 and 30 and the pinch rollers 31 and 32 of the discharge portion sandwich and transport the recording medium 20 to the sheet stacker portion 33. A drive source (not shown) transmits a drive force through a gear and the like to rotate the rollers in the fixing device 28, the discharge rollers 29 and 30, and the pinch rollers 31 and 32 of the discharge portion.

An operation of the image forming apparatus 1 will be explained next. First, the hopping roller 22 separates and transports the recording medium 20 stored in the sheet cassette 21 in the stacked state from the upper most position one by one. Then, the transportation roller 25, the register roller 26, and the pinch rollers 23 and 24 sandwich and transport the recording medium 20 between the photosensitive drum 11 of the process unit 10-1 and the transfer device 27.

In the next step, the photosensitive drum 11 and the transfer device 27 sandwich the recording medium 20, so that a toner image is transferred to a recording surface of the recording medium 20. At the same time, the photosensitive drum 11 rotates to transport the recording medium 20. Similarly, the recording medium 20 sequentially passes through the process units 10-2 to 10-4. During the process, the developing device 14 develops the static latent image formed with the print head 13 to form the toner image in each color, and the toner image is sequentially transferred and overlapped on the recording surface of the recording medium 20.

After the toner image in each color is sequentially transferred and overlapped on the recording surface of the recording medium 20, the fixing device 28 fixes the toner image to the recording medium 20. Then, the discharge rollers 29 and 30 and the pinch rollers 31 and 32 sandwich the recording medium 20, so that the recording medium 20 is discharged on the sheet stacker portion 33 outside the image forming apparatus 1. Through the process described above, a color image is formed on the recording medium 20.

Figure 3:
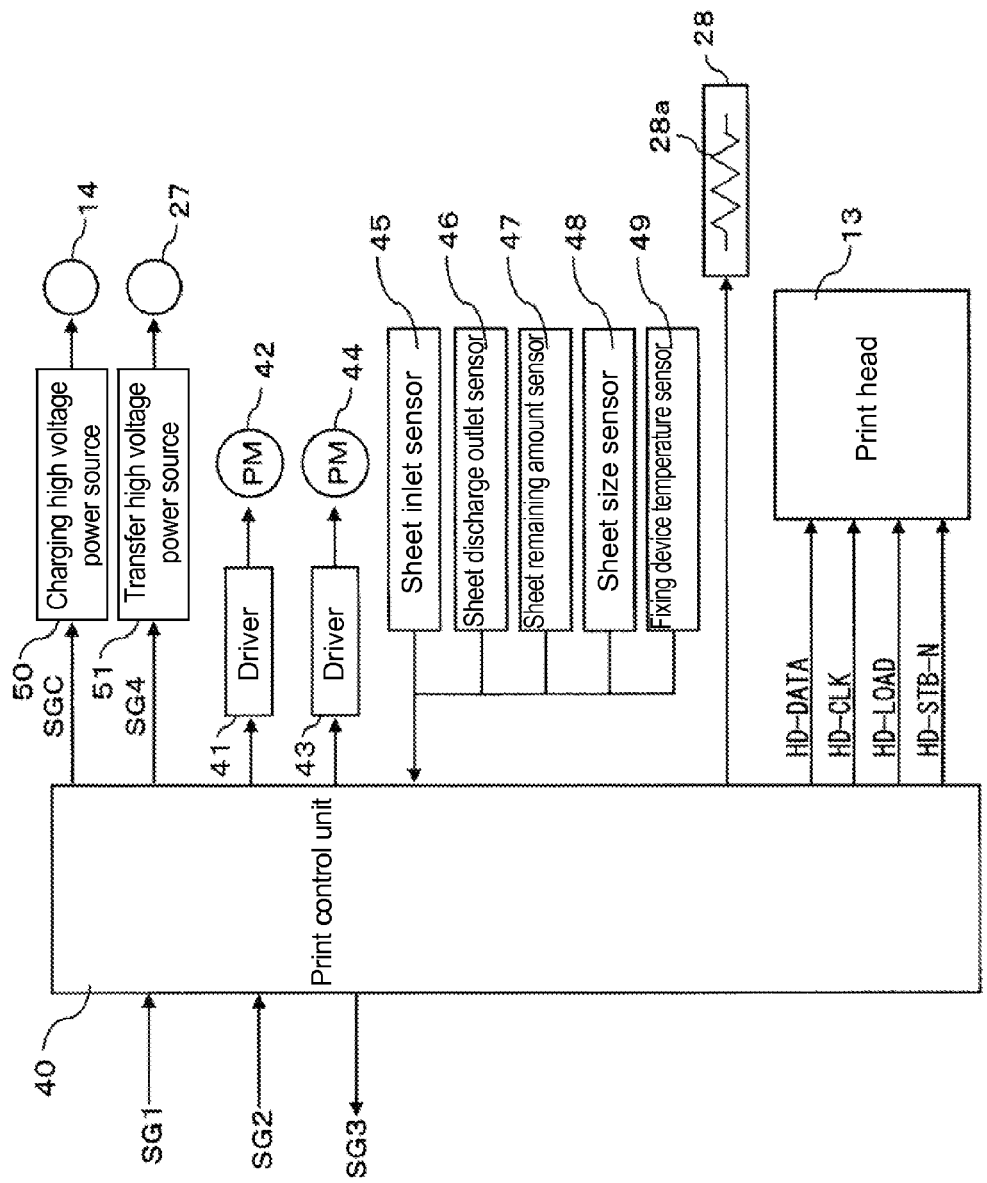
FIG. 3 is a block diagram showing a configuration of a control system of the image forming apparatus according to the first embodiment of the present invention.

A control system of the image forming apparatus 1 will be explained next. FIG. 3 is a block diagram showing a configuration of the control system of the image forming apparatus 1 according to the first embodiment of the present invention.

As shown in FIG. 3, the control system of the image forming apparatus 1 includes a print control unit 40. The print control unit 40 is formed of a microprocessor; a read-only memory (referred to as an ROM); a random access memory (referred to as an RAM); an input-output port for inputting and outputting a signal; a timer; and the likes. The print control unit 40 is provided for performing a sequence control of an entire portion of the image forming apparatus 1 and a printing operation according to a control signal SG1, a video signal SG2 (in which dot map data are arranged one-dimensionally), and the likes from an image processing unit (not shown).

As shown in FIG. 3, the print control unit 40 is connected to the print head 13 in each of the process units 10-1 to 10-4; a heater 28a of the fixing device 28; drivers 41 and 43; a sheet inlet sensor 45; a sheet discharge outlet sensor 46, a sheet remaining amount sensor 47; a sheet size sensor 48; a fixing device temperature sensor 49; a charging high voltage power source 50; a transfer high voltage power source 51; and the likes. The driver 41 is connected to a developing transfer process motor 42 (PM). The driver 42 is connected to a sheet transportation motor 44 (PM). The charging high voltage power source 50 is connected to the developing device 14. The transfer high voltage power source 51 is connected to the transfer device 27.

An operation of the control system of the image forming apparatus 1 will be explained next. When the print control unit 40 receives a print direction along with the control signal SG1 from the image processing unit (not shown), the print control unit 40 first detects whether the heater 28a disposed in the fixing device 28 is within an operable temperature range using the fixing device temperature sensor 49. When the heater 28a of the fixing device 28 is not within the operable temperature range, the print control unit 40 energizes the heater 28a to heat the fixing device 28 up to an operable temperature.

In the next step, the print control unit 40 controls the developing transfer process motor 42 to rotate through the driver 41. At the same time, the print control unit 40 turns on the charging high voltage power source 50 with a charge signal SGC, thereby charging the developing device 14.

In the next step, the sheet remaining amount sensor 47 and the sheet size sensor 48 detects the sheet 20 and a size thereof, and the sheet 20 is transported. The sheet supply motor 44 is connected to a planetary gear mechanism (not shown), so that the sheet supply motor 44 is capable of rotating in two directions through the driver 43. Accordingly, when the sheet supply motor 44 rotates in a specific direction, it is possible to selectively drive the transportation roller 25 or other different rollers in the image forming apparatus 1.

In the next step, each time the printing operation starts for printing one page, the print control unit 40 controls the sheet supply motor 44 to rotate in a reverse direction to transport the sheet 20 for a specific distance until the sheet inlet sensor 45 detects the sheet 20. Then, the print control unit 40 controls the sheet supply motor 44 to rotate in a forward direction to transport the sheet 20 into a printing mechanism in the image forming apparatus 1.

When the sheet 20 reaches a printable position, the print control unit 40 sends a timing signal SG3 (including a main scanning synchronization signal and a sub scanning synchronization signal) to the image processing unit (not shown), and the print control unit 40 receives the video signal SG2 from the image processing unit (not shown). The image processing unit (not shown) edits the video signal SG2 per page. When the print control unit 40 receives the video signal SG2, the print control unit 40 sends the video signal SG2 as a print data HD-DATA to each of the print heads 13. Each of the print heads 13 is formed of a plurality of LEDs arranged therein each for printing one dot (pixel).

When the print control unit 40 receives the video signal SG2 for one line, the print control unit 40 sends a latch signal HD-LOAD to each of the print heads 13, so that the print data signal HD-DATA is stored in each of the print heads 13. Note that the print control unit 40 is capable of printing the print data HD-DATA stored in each of the print heads 13 while the print control unit 40 receives a next video signal SG2 from the image processing unit (not shown).

In the embodiment, a clock signal HD-CLK (referred to as a clock) is transmitted to each of the print heads 13 for sending the print data HD-DATA to each of the print heads 13. Further, a drive on off instruction signal HD-STB-N (for example, a strobe signal) is also transmitted to each of the print heads 13. In the drive on off instruction signal HD-STB-N, a symbol "-N" represents a negative logic signal.

In the embodiment, the video signal SG2 is sent and received per print line. Each of the print heads 13 irradiates light on the photosensitive drum 11 charged with a negative potential. Accordingly, information to be printed is converted to the static latent image on the photosensitive drum 11 as a dot with an increased potential. In the developing device 14, toner charged with a negative potential is attracted to each dot through an electric attraction force, thereby forming and developing the toner image.

In the next step, the toner image formed on the photosensitive drum 11 is transported to the transfer device 27. The transfer high voltage power source 51 is turned on and becomes a negative potential with a transfer signal SG4, so that the transfer device 27 transfers the toner image to the sheet 20 passing between the photosensitive drum 11 and the transfer device 27.

After the toner image is transferred to the sheet 20, the sheet 20 abuts against the fixing device 28 with the heater 28a disposed therein, and is transported further, thereby fixing the toner image to the sheet 20 through heat of the fixing device 28. After the toner image is fixed to the sheet 20, the sheet 20 is transported further, and is discharged from the printing mechanism of the image forming apparatus 1 to outside the image forming apparatus 1 after passing through the sheet discharge outlet sensor 46.

In the embodiment, the print control unit 40 applies a voltage from the transfer high voltage power source 51 to the transfer device 27 only when the sheet 20 passes through the transfer device 27 according to detections of the sheet size sensor 48 and the sheet inlet sensor 45. After the printing operation is performed and the sheet 20 passes through the sheet discharge outlet sensor 46, the print control unit 40 stops applying the voltage from the charging high voltage power source 50 to the developing device 14, and stops the developing transfer process motor 42. Afterward, the printing operation described above is repeated.

Figure 4:
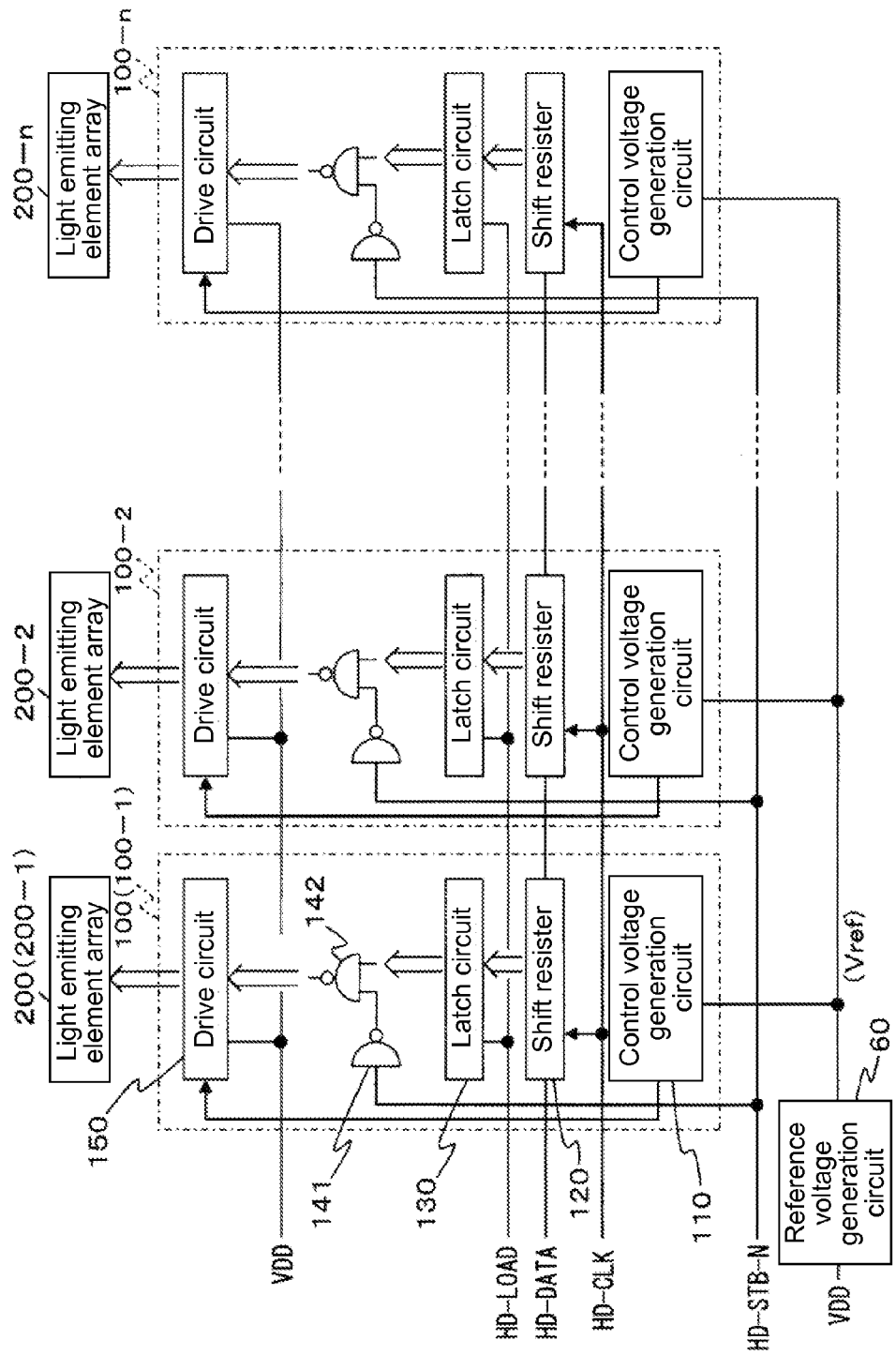
FIG. 4 is a block diagram showing a configuration of a print head of the image forming apparatus according to the first embodiment of the present invention.

A configuration of the print head 13 will be explained next. FIG. 4 is a block diagram showing a configuration of the print head 13 of the image forming apparatus 1 according to the first embodiment of the present invention.

In the following description, as an example, the print head 13 is capable of printing on a sheet with A-4 size at a resolution of 600 dots per one inch.

In the embodiment, the print head 13 includes a print circuit board (not shown). A reference voltage generation circuit 60, a plurality of driver monolithic integrated circuits (referred to as driver ICs) 100 (equal to 100-1 to 100-n, where n is equal to, for example, 26), and a plurality of light emitting element arrays 200 (equal to 200-1 to 200-n, where n is equal to 26) are arranged on the print circuit board. The light emitting element arrays 200 and the driver ICs 100 for driving the light emitting element arrays 200 are arranged to face each other. It is noted that the reference voltage generation circuit 60 and the driver ICs 100-1 to 100-n constitute a drive device of the image forming apparatus 1.

In the embodiment, the reference voltage generation circuit 60 is provided for generating a reference voltage Vref according to a potential of a first power source (for example, a power source voltage VDD). An output terminal of the reference voltage generation circuit 60 is connected to the driver ICs 100. An output terminal of each of the driver ICs 100 is connected to each of the light emitting element arrays 200.

In the embodiment, a plurality (for example, 192) of LEDs is arranged linearly in each of the light emitting element arrays 200. Accordingly, a total number of the LEDs is 4,992 (dots). The driver ICs 100 for driving the light emitting element arrays 200 are formed of an identical circuit, and adjacent driver ICs (for example, the driver IC 100-1 and 100-2) are connected in a cascade connection (a vertical connection). One single chip of the driver IC 100 is capable of driving 192 LEDs, and 26 chips of the driver ICs 100 are connected in the cascade connection for transmitting in a serial fashion the print data HD-DATA transmitted from the print control unit 40 when the printing operation is performed.

In the embodiment, each of the driver ICs 100 includes a control voltage generation circuit 110 for generating a control voltage; a shift resister 120 for receiving the clock signal HD-CLK transmitted from the print control unit 40 and performing shift transfer of the print data HD-DATA; a latch circuit 130 for latching an output signal of the shift resister 120 according to the latch signal HD-LOAD transmitted from the print control unit 40; an inverter 141 for inverting the strobe signal HD-STB-N transmitted from the print control unit 40; a logic circuit (for example, a negative logical product circuit or an NAND circuit 142) for obtaining a logic of an output signal of the latch circuit 130 and the inverter 141; and a drive circuit 150 for supplying a drive current to the light emitting element arrays 200 from the power source voltage VDD.

In the embodiment, the control voltage generation circuit 110 is provided for maintaining the drive current of the drive circuit 150 at a constant level. As shown in FIG. 4, the reference voltage generation circuit 60 is disposed in the print head 13 for commonly controlling the driver ICs 100-1 to 100-n. Alternatively, the reference voltage generation circuit 60 may be provided in each of the driver ICs 100.

A configuration of the reference voltage generation circuit 60 will be explained next. FIG. 1 is a circuit diagram showing the configuration of the reference voltage generation circuit 60 of the image forming apparatus 1 according to the first embodiment of the present invention.

As shown in FIG. 1, the reference voltage generation circuit 60 includes a current-mirror circuit portion 61. The current-mirror portion 61 includes a first current-mirror circuit and a second current-mirror circuit. The first current-mirror circuit is formed of a first MOS transistor of a first conductive type (for example, a P-channel MOS, or a PMOS 61a) and a second MOS transistor of the first conductive type (for example, a PMOS 61b). The second current-mirror circuit is formed of a third MOS transistor of a second conductive type (for example, an N-channel MOS, or an NMOS 61c) and a fourth MOS transistor of the second conductive type (for example, an NMOS 61d). The first current-mirror circuit is vertically connected to the second current-mirror circuit.

In the embodiment, a source of the PMOS 61a of the first current-mirror circuit is connected to a power source VDD, and a gate of the PMOS 61a is connected to a gate of the PMOS 61b through a node N1. Accordingly, the PMOS 61a is configured such that a drain current I1 flows between the source and a drain thereof. Further, a source of the PMOS 61b of the first current-mirror circuit is connected to the power source VDD, and a drain of the PMOS 61b is connected to a gate thereof. Accordingly, the PMOS 61b is configured to operate in a saturated state, and a drain current I2 thereof flows between the source and the drain thereof.

In the embodiment, a drain and a gate of the NMOS 61c of the second current-mirror circuit are connected to the drain of the PMOS 61a, and a source of the NMOS 61c is connected to a first node N3 corresponding to a control side terminal of the current-mirror circuit portion 61. Accordingly, the NMOS 61c is configured to have a gate-source voltage Vgs1. Further, a drain of the NMOS 61d of the second current-mirror circuit is connected to the drain of the PMOS 61b, a gate of the NMOS 61d is connected to the gate of the NMOS 61c through a node N2, and a source of the NMOS 61d is connected to a second node N4 corresponding to a follower side terminal of the current-mirror circuit portion 61. Accordingly, the NMOS 61d is configured to have a gate-source voltage Vgs2.

As shown in FIG. 1, the reference voltage generation circuit 60 further includes a first bipolar transistor (for example, an NPN transistor or an NPNTR 65) and a second bipolar transistor (for example, an NPN transistor or an NPNTR 66). A collector of the NPN transistor 65 is connected to the first node N3 through a first resistor 62 with a resistivity R1 and a node N5. A base of the NPN transistor 65 is connected to the first node N3, and an emitter of the NPN transistor 65 is connected to a second power source (for example, a ground GND). Accordingly, the NPN transistor 65 is configured to have a base-emitter voltage Vbe1. A collector of the NPN transistor 66 is connected to the second node N4 through a second resistor 63 with a resistivity R2. A base of the NPN transistor 66 is connected to the node N5 on a side of the collector of the NPN transistor 65, and an emitter of the NPN transistor 66 is connected to the ground GND. Accordingly, the NPN transistor 66 is configured to have a base-emitter voltage Vbe2.

As shown in FIG. 1, the reference voltage generation circuit 60 further includes a fifth MOS transistor (for example, a PMOS 61e). A gate of the PMOS 61e is connected to the drain of the PMOS 61b, a source of the PMOS 61e is connected to the power source VDD, and a drain of the PMOS 61e is connected to an output terminal Vref for outputting the reference voltage Vref through a node N6. Accordingly, the PMOS 61e is configured such that a drain current I3 flows between the source and the drain og the PMOS 61e. The node N6 is connected to the ground GND through the third resistor 63 with the resistivity R2.

In the embodiment, the second resistor 63 is provided for making a collector potential of the NPN transistor 66 substantially equal to a collector potential of the NPN transistor 65. When it is not necessary to match an operation point of the NPN transistor 65 to that of the NPN transistor 66, the second resistor 63 may be omitted.

In the embodiment, the NPN transistor 66 is configured to have an emitter area larger than an emitter area of the NPN transistor 65 by N times (N>1). The PMOSs 61a, 61b, and 61e are configured to have a substantially identical gate length. Further, the sources of the PMOSs 61a, 61b, and 61e are connected to the gates thereof to have a substantially identical voltage between the gates and the sources, so that the PMOSs 61a, 61b, and 61e are in a current-mirror relationship.

For a simple explanation, when the gates of the PMOSs 61a, 61b, and 61e have an identical width, the drain currents I1 to I3 thereof become identical. Accordingly, an output characteristic of the PMOSs 61a, 61b, and 61e becomes approximately a constant current characteristic. In order to improve the constant current characteristic, it is preferred that the PMOSs 61a, 61b, and 61e have a large gate length.

Similarly, when the gates of the NMOSs 61c and 61d have an identical length and an identical width, it is possible to match an operation state of the NMOS 61c to that of the NMOS 61d. As described above, the drain current I1 is equal to the drain current I2. Accordingly, the drain currents of the NMOSs 61c and 61d are identical, and the gate-source voltages Vgs1 and Vgs2 are identical. The gate of the NMOS 61c is connected to the gate of the NMOS 61d through the node N2, so that the gates of the NMOSs 61c and 61d have an identical potential. Accordingly, it is possible to make a potential of the node N3 equal to that of the node N4.

In the embodiment, it is possible to set the resistivity R1 of the first resistor 62 equal to the resistivity R3 of the second resistor 63. When the NPN transistor 65 has a large current amplifying ratio, it is possible to ignore a base current relative to a collector current. Accordingly, the drain currents I1 and I2 are equal to currents flowing through the first resistor 62 and the second resistor 63, and further are equal to collector currents of the NPN transistor 65 and the NPN transistor 66. As described above, the drain current I1 is equal to the drain current I2 and the drain current I3. Accordingly, a voltage drop generated at both end portions of the first resistor 62 and the second resistor 63 becomes identical. Further, it is possible to make a collector potential of the NPN transistor 65 equal to that of the NPN transistor 66.

In the reference voltage generation circuit 60, for example, when the potential of the node N3 drops, the potential of the node N2 on the gate side drops according to a value of the gate-source voltage Vgs1 of the NMOS 61c. At this moment, the gate-source voltage Vgs2 of the NMOS 61d is equal to the gate-source voltage Vgs1 of the NMOS 61c. Accordingly, the potential of the node N4 drops as well and becomes equal to the potential of the node N3. Similarly, when the potential of the node N3 increases, the potential of the node N4 increases.

In the embodiment, the node N3 is connected to the base of the NPN transistor 65. Accordingly, even when a value of the power source VDD fluctuates, a base potential of the NPN transistor 65 does not fluctuate to a large extent. As described above, the potential of the node N4 is substantially equal to the potential of the node N3, and, the collector potential of the NPN transistor 65 is substantially equal to the collector potential of the NPN transistor 66. Accordingly, even when the value of the power source VDD fluctuates, it is possible to minimize a variance in the collector potentials of the NPN transistor 65 and the NPN transistor 66.

In order to clearly explain an effect of the reference voltage generation circuit 60 in the first embodiment, a comparative example will be explained. First, a configuration of a reference voltage generation circuit 60A of the comparative example will be explained.

Figure 5:
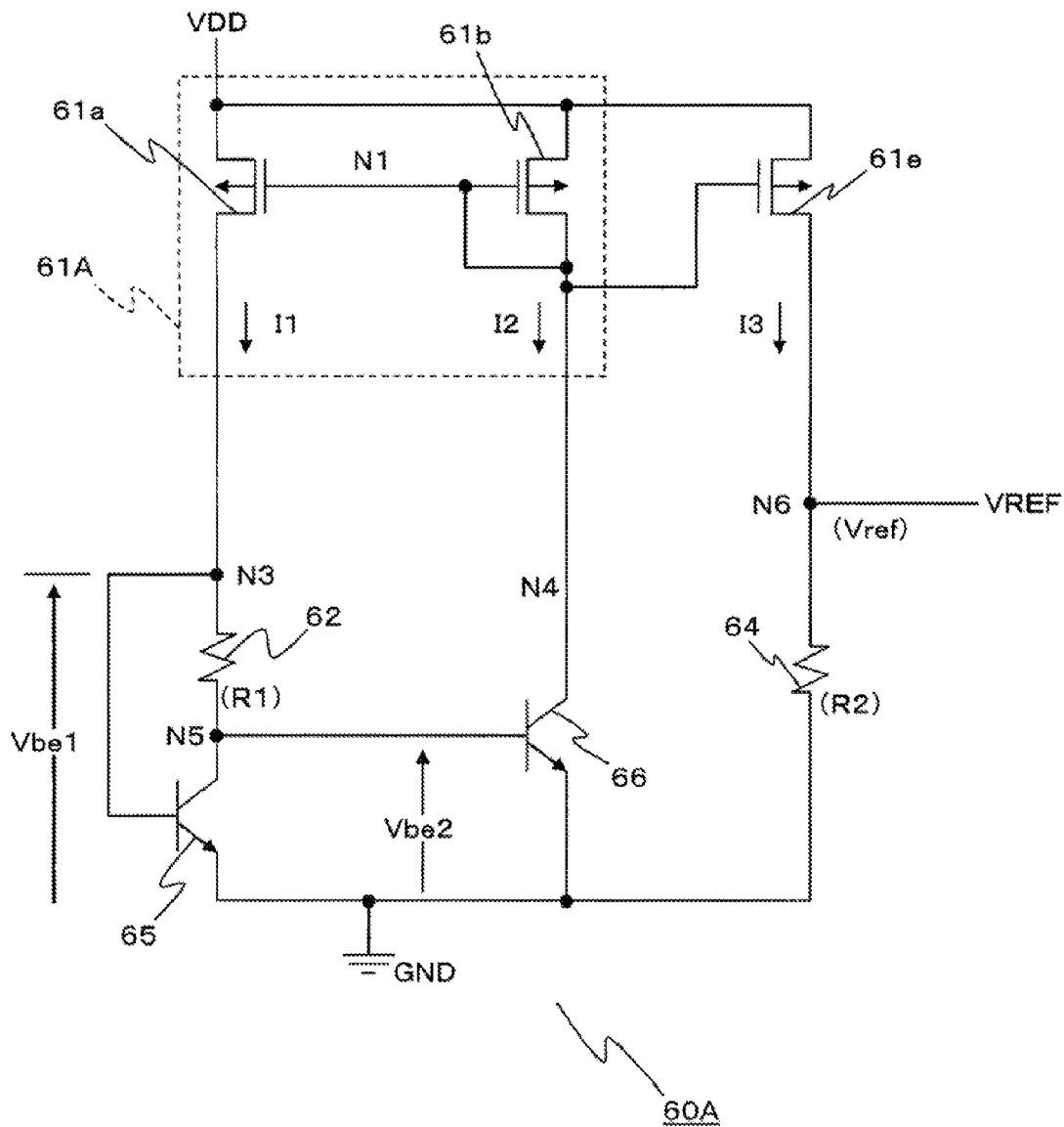
FIG. 5 is a circuit diagram showing a configuration of a reference voltage generation circuit of a comparative example.

FIG. 5 is a circuit diagram showing the configuration of the reference voltage generation circuit 60A of the comparative example. Components of the reference voltage generation circuit 60a similar to those of the reference voltage generation circuit 60 are designated with the same reference numerals.

As shown in FIG. 5, instead of the current-mirror circuit portion 61 of the reference voltage generation circuit 60 in the first embodiment, the reference voltage generation circuit 60A includes a current-mirror circuit 61A having a configuration different from that of the current-mirror circuit portion 61. Further, the second resistor 63 in the reference voltage generation circuit 60 is omitted. The current-mirror circuit 61A is formed of the PMOS 61a and the PMOS 61b in the first embodiment. Other configurations of the comparative example are similar to those in the first embodiment.

When the reference voltage generation circuit 60A of the comparative example is compared with the reference voltage generation circuit 60 in the first embodiment, in the reference voltage generation circuit 60 in the first embodiment, the NMOS 61c and the NMOS 61d are disposed between the PMOS 61a and the PMOS 61b, and the NPN transistor 65 and the NPN transistor 66. Accordingly, it is possible to make the potential of the node N3 substantially equal to the potential of the node N4. Further, the node N3 on the source side of the NMOS 61c is connected to the base of the NPN transistor 65. Accordingly, even when the value of the power source voltage VDD fluctuates, the base potential of the NPN transistor 65 does not fluctuate to a large extent. Further, the potential of the node N3 is substantially equal to the potential of the node N4. Accordingly, the collector potential of the NPN transistor 65 and the NPN transistor 66 does not fluctuate to a large extent as well.

On the other hand, in the reference voltage generation circuit 60A of the comparative example, when the power source voltage VDD increases, the collector potential of the NPN transistor 66 follows and increases. Accordingly, the collector current of the NPN transistor 66 increases. This is known to be a phenomenon due to an insufficient early voltage of the NPN transistor 66.

As well-known in the art, in a bipolar transistor operating in an active region, when a collector-emitter voltage Vce increases, a collector current Ic increases. In a graph representing a relationship between the collector-emitter voltage Vce and the collector current Ic, a tangential line of a characteristic curve in the active region crosses a horizontal axis of the graph, i.e., a collector-emitter voltage Vce axis, in a negative region. The early voltage corresponds to the collector-emitter voltage Vce (in the negative region) corresponding to the cross point.

For example, when the NPN transistor 65 and the NPN transistor 66 are disposed in a Complementary Metal Oxide Semiconductor transistor (referred to as CMOS), the NPN transistor 65 and the NPN transistor 66 are formed as a parasitic element. Accordingly, the NPN transistor 65 and the NPN transistor 66 are hardly provided with an ideal property, and it is difficult to increase the early voltage. As a result, the drain currents I1, I2, and I3 flowing through the PMOS 61a, the PMOS 61b, and the PMOS 61e tend to be greater than a specific value, and the potential of the node N6 tends to increase. Accordingly, the reference voltage Vref output from the output terminal VREF increases. Similarly, when the power source voltage VDD decreases, the reference voltage Vref decreases, thereby causing a problem.

As explained above, in the reference voltage generation circuit 60A of the comparative example, it is difficult to obtain the satisfactory performance. To this end, in the reference voltage generation circuit 60 in the first embodiment, the NMOS 61c and the NMOS 61d are disposed between the PMOS 61a and the PMOS 61b, and the NPN transistor 65 and the NPN transistor 66, thereby solving the problem of the comparative example.

Figure 6:
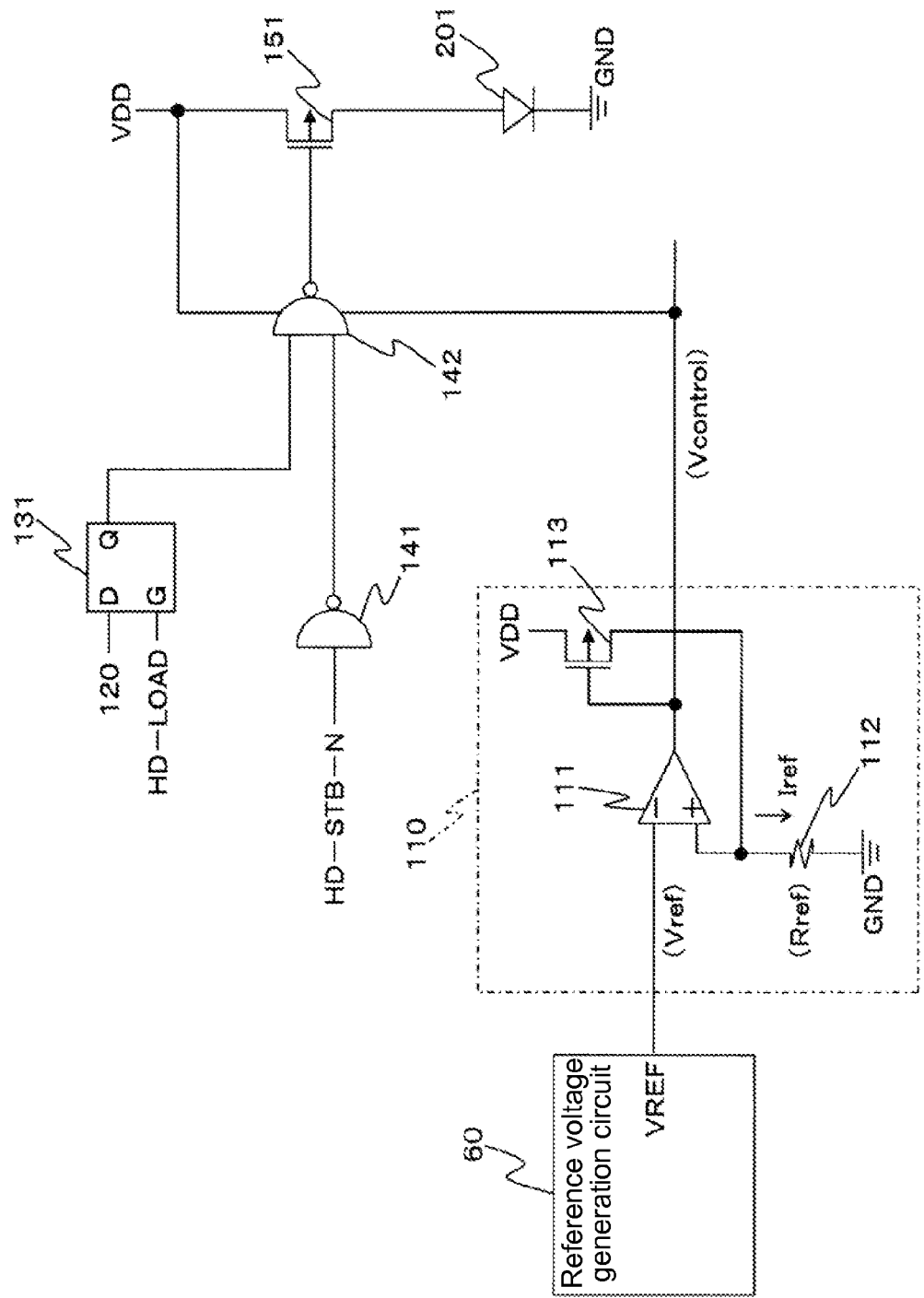
FIG. 6 is a circuit diagram showing a configuration of a drive device according to the first embodiment of the present invention.

A configuration of a drive device will be explained next. FIG. 6 is a circuit diagram showing the configuration of the drive device according to the first embodiment of the present invention. The circuit diagram shown in FIG. 6 represents the drive device for driving one dot (for example, one LED as the driven element).

As shown in FIG. 6, in the drive device in the first embodiment, a control voltage generation circuit 110 is connected to the output terminal VREF of the reference voltage generation circuit 60. It is noted that one control voltage generation circuit 110 is provided for each of the driver ICs 100.

In the embodiment, the drive device includes an operational amplifier (referred to as an operation amplifier 111), a resistor 112 with a resistivity Rref, and a PMOS transistor 113. It is noted that the operation amplifier 111, the resistor 112, and the PMOS transistor 113 constitute a feedback control circuit.

In the embodiment, an inversion terminal of the operation amplifier 111 is connected to the output terminal VREF and a non-inversion terminal of the operation amplifier 111 is connected to the ground GND through the resistor 112. The non-inversion terminal of the operation amplifier 111 is further connected to a drain of the PMOS transistor 113. An output terminal of the operation amplifier 111 is connected to a gate of the PMOS transistor 113 for outputting a control voltage Vcontrol. A source of the PMOS transistor 113 is connected to the power source VDD. The control voltage generation circuit 110 is configured such that a reference current Iref flowing through the resistor 112, i.e., a current flowing between the source and the gate of the PMOS transistor 113, is not dependent on the power source voltage VDD, and is determined only by the reference voltage Vref input to the control voltage generation circuit 110 and the resistivity Rref of the resistor 112.

In the embodiment, the drive device further includes a latch circuit (referred to as an LT 131) for one dot constituting the latch circuit 130. The latch circuit 131 includes a terminal G for inputting the latch signal HD-LOAD, a data input terminal D for inputting the print data output from the control voltage generation circuit 110, and a data output terminal Q. When the latch signal HD-LOAD is input, the print head 131 latches the print data output from the control voltage generation circuit 110, and outputs the print data from the output terminal. An NAND circuit 142 is connected to the output terminal Q of the print head 131 and an output terminal of an inverter 141 for inverting the strobe signal HD-STB-N.

In the embodiment, a power source terminal of the NAND circuit 142 is connected to the power source VDD, and a ground terminal of the NAND circuit 142 is connected to the output terminal of the operation amplifier 111. Accordingly, when an output potential of the NAND circuit 142 is at a high level (referred to as an H level), a potential substantially equal to the power source voltage VDD is output. When the output potential of the NAND circuit 142 is at a low level (referred to as an L level), a potential substantially equal to the control voltage Vcontrol is output.

Further, an output terminal of the NAND circuit 142 is connected to a gate of a drive element (for example, a PMOS 151) for one dot constituting the drive circuit 150. A source of the PMOS 151 is connected to the power source VDD. A drain of the PMOS 151 is connected to anode of an LED 201 for one dot in the light emitting element arrays 200, and a cathode of the LED 201 is connected to the ground GND.

In the embodiment, the PMOS transistor 113 of the control voltage generation circuit 110 is configured such that a gate length of the PMOS transistor 113 is substantially equal to a gate length of the PMOS 151 and the like. In the control voltage generation circuit 110, the operation amplifier 111 is provided for controlling such that a potential of the inversion terminal of the operation amplifier 111 becomes substantially equal to a potential of the non-inversion terminal of the operation amplifier 111. Accordingly, the potential of the non-inversion terminal of the operation amplifier 111 becomes substantially equal to the reference voltage Vref thus input. As a result, the reference current flowing through the resistor 112 is given by the following equation:

$$Iref = Vref/Rref$$

In the embodiment, it is configured such that gate length of the PMOS transistor 113 is substantially equal to the gate length of the PMOS 151 and the like for driving the LED 201. When the LED 201 is driven, the gate potential of the PMOS 113 becomes equal to the control voltage Vcont. Accordingly, the PMOS 113 and the PMOS 151 and the like for driving the LED 201 operate in a saturated region, and have a current-mirror relationship. Accordingly, the drive current of the LED 201 and the like is proportional to the reference current Iref, and the reference current I ref is proportional to the reference voltage Vref input from the output terminal VREF. As a result, it is possible to collectively adjust the drive current of the LED 201 according to the reference voltage Vref.

Figure 7:
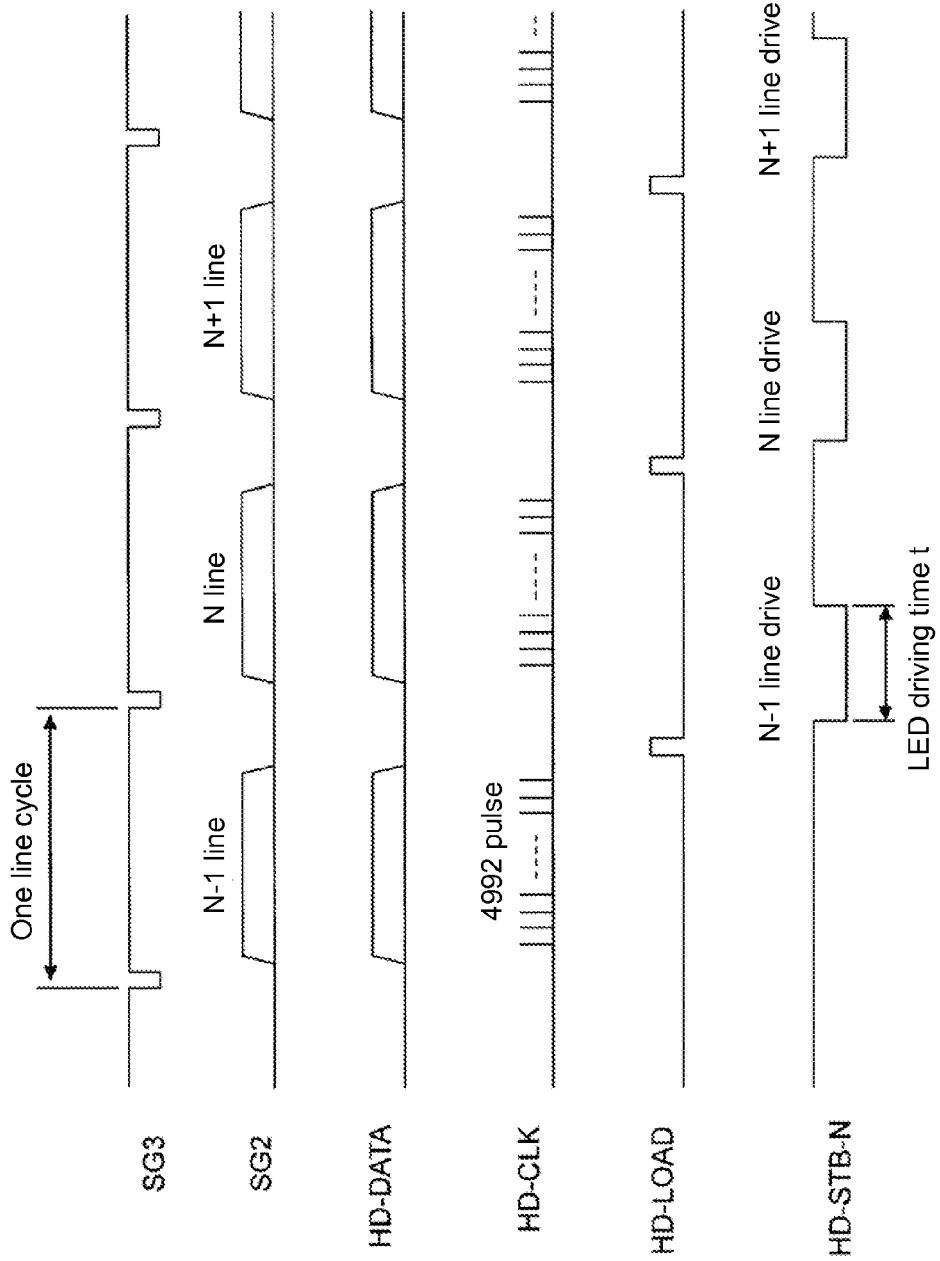
FIG. 7 is a time chart showing an operation of the print head of the image forming apparatus according to the first embodiment of the present invention.

An operation of the print head 13 will be explained next. FIG. 7 is a time chart showing the operation of the print head 13 of the image forming apparatus 1 according to the first embodiment of the present invention.

When a printing operation starts, the print control unit 40 shown in FIG. 3 outputs one pulse of a timing signal SG3 per print one line cycle, so that the pulse is transmitted to the image processing unit (not shown). With the timing signal SG3, the image processing unit generates a video signal SG2 per an N−1 line, an N line, an N=1 line, . . . , so that the video signal SG2 is transmitted to the print control unit 40. At the same time, the print control unit 40 inputs the clock signal HD-CLK and the print data HD-DATA to the print head 13.

In the embodiment, as an example, the print head 13 is capable of printing on a sheet with A-4 size at the resolution of 600 dots per one inch, and the total number of the LEDs 201 is 4,992 (dots). Accordingly, the total number of the pulses of the clock signal HD-CLK is 4,992. After 4,992 of the pulses are transmitted, the print control unit 40 generates a pulse of the latch signal HD-LOAD, and the latch circuit 130 latches the print data HD-DATA shift input to the shift resister 120 in the print head 13.

In the next step, the print control unit 40 generates the strobe signal HD-STB-N with the L level per an N−1 line, an N line, an N=1 line, . . . . During an LED driving time t when the strobe signal HD-STB-N is at the L level, the LED 201 emits light. Accordingly, the print head 13 irradiates light on the photosensitive drum 11 shown in FIG. 2, thereby forming the static latent image thereon.

An operation of the reference voltage generation circuit 60 shown in FIG. 1 will be quantitatively explained. First, the drain current I1 flowing through the PMOS 61a is determined. As well known in the art, there is a relationship between an emitter current Ie and a base-emitter voltage Vbe of a bipolar transistor represented with the following equation (1):

$$Ie \approx Is \times \exp(qVbe/(kT)) \quad (1)$$

where Is is a saturated current, i.e., a constant determined proportional to an element area of the bipolar transistor; exp ( ) is an exponent function; q is a charge of an electron (q=1.6×10$^{-19}$ C); k is the Boltzmann constant (k=1.38×10$^{-23}$ J/K); and T is an absolute temperature (=about 298 K at a room temperature 25° C.).

When the equation (1) is modified, it is possible to obtain the following equation (2):

$$Vbe = (kT/q) \times \ln(Ie/Is) \quad (2)$$

where ln( ) is a natural logarithmic function.

It is supposed that the NPN transistor 65 and the NPN transistor 66 have base-emitter voltages Veb1 and Veb2, emitter currents Ie1 and Ie2, and saturated currents Is1 and Is2, respectively. Accordingly, with respect to the NPN transistor 65 and the NPN transistor 66, the following equation (3) is established:

$$Vbe1 = (kT/q) \times \ln(Ie1/Is1)$$

$$Vbe2 = (kT/q) \times \ln(Ie2/Is2) \quad (3)$$

In FIG. 1, one end portion of the first resistor 62 with the resistivity R1 has a potential equal to the base-emitter voltage Vbe1, and the other end portion of the first resistor 62 has a potential equal to the base-emitter voltage Vbe2. Accordingly, a voltage difference ΔVbe generated between the end portions of the first resistor 62 is given by the following equation (4):

$$\Delta Vbe = Vbe1 - Vbe2 \quad (4)$$

When the equation (3) is incorporated into the equation (4), the following equation (5) is obtained:

$$\Delta Vbe = (kT/q) \times [\ln(Ie1/Is1) - \ln(Ie2/Is2)] \quad (5)$$

As described above, the ratio of the emitter area of the NPN transistor 66 relative to the emitter area of the NPN transistor 65 is set 1:N (N>1). Further, the saturated currents Is1 and Is2 are proportional to the element areas of the NPN transistor 65 and the NPN transistor 66. Accordingly, the saturated current Is2 is N times greater than the saturated current Is1 (Is2=Is1× N). Further, the PMOSs 61a and 61b are in the current-mirror relationship. Accordingly, the drain current I1 is equal to the drain current I2 (I1=I2). As a result, the emitter current Ie1 is substantially equal to the emitter current Ie2, and the following equation (6) is obtained:

$$\Delta Vbe = (kT/q) \times \ln(N) \quad (6)$$

In the embodiment, the drain current I1 shown in FIG. 1 is substantially equal to the current flowing through the first resistor 62 with the resistivity R1. Accordingly, the following equation (7) is obtained:

$$I1 = \Delta Vbe/R1 = (1/R1) \times (kT/q) \times \ln(N) \quad (7)$$

Further, as explained above, the PMOSs 61a, 61b, and 61e are in the current-mirror relationship, so that the drain currents I1, I2, and I3 have an identical value (I1=I2=I3). Accordingly, the reference voltage Vref generated at the node N6 on the side of the one end portion of the resistor 64 with the resistivity R2 is given by the following equation (8):

$$Vref = I3 \times R2 = (R2/R1) \times (kT/q) \times \ln(N) \quad (8)$$

In the embodiment, the reference voltage Vref is proportional to the absolute temperature T, so that the reference voltage Vref has a positive temperature coefficient Tc. The temperature coefficient Tc is given by the following equation (9):

$$Tc = \frac{1}{Vref} \times \frac{\partial Vref}{\partial T} \quad (9)$$

Accordingly, the temperature coefficient Tc of the reference voltage generation circuit 60 shown in FIG. 1 is equal to 1/T (Tc=1/T), and becomes about +0.33%/° C. at a room temperature (about 25° C.).

A temperature characteristic of a luminescence output of the LED 201 as the driven element will be explained next.

For example, when the LED 201 is formed of a material such as AlGaAs, the luminescence output of the LED 201 has a characteristic decreasing at a rate of −0.25%/° C. with an increase in a temperature when the LED 201 is driven with a constant current. In order to compensate the temperature characteristic of the LED 201, it is necessary to increase the drive current with the increase in the temperature. More specifically, it is necessary to increase the drive current with the temperature coefficient of about 0.25%/° C.

When the LED 201 is formed of a material such as GaAs, the temperature coefficient of the drive current becomes about 0.6%/° C. in order to compensate the temperature characteristic of the LED 201. When the LED 201 is formed of a material such as AlGaInP, the temperature coefficient of the drive current becomes about 1.0%/° C. in order to compensate the temperature characteristic of the LED 201.

As described above, depending on the material of the LED 201 or a luminescence wave length (a luminescence color), the temperature coefficient of the drive current tends to vary. In the reference voltage generation circuit 60 shown in FIG. 1, the temperature coefficient thereof becomes about +0.33%/° C., similar to the temperature coefficient of the LED 201 formed of AlGaAs. Accordingly, the reference voltage generation circuit 60 is preferably provided for driving the LED 201.

A dependence of the power source voltage VDD in the reference voltage generation circuit 60 shown in FIG. 1 will be explained next. As described above, in the reference voltage generation circuit 60 shown in FIG. 1, the NMOS 61c and the NMOS 61d are disposed between the PMOS 61a and the PMOS 61b, and the NPN transistor 65 and the NPN transistor 66. Accordingly, it is possible to make the potential of the node N3 substantially equal to the potential of the node N4. Further, the node N3 on the source side of the NMOS 61*c* is connected to the base of the NPN transistor 65. Accordingly, even when the value of the power source voltage VDD fluctuates, the base potential of the NPN transistor 65 does not fluctuate to a large extent. Further, the potential of the node N3 is substantially equal to the potential of the node N4. Accordingly, even when the value of the power source voltage VDD fluctuates, the collector potential of the NPN transistor 65 and the NPN transistor 66 does not fluctuate to a large extent as well. As a result, in the reference voltage generation circuit 60 in the first embodiment, even when the value of the power source voltage VDD fluctuates, it is possible to minimize the property variance associated with the fluctuation.

On the other hand, in the reference voltage generation circuit 60A of the comparative example shown in FIG. 5, when the power source voltage VDD increases, the collector potential of the NPN transistor 66 follows the power source voltage VDD and increases. Accordingly, the collector current of the NPN transistor 66 increases. As a result, the drain currents I1 to I3 become larger than a specific level. Accordingly, the potential of the node N6 increases, thereby increasing the reference voltage Vref.

Figure 8A:
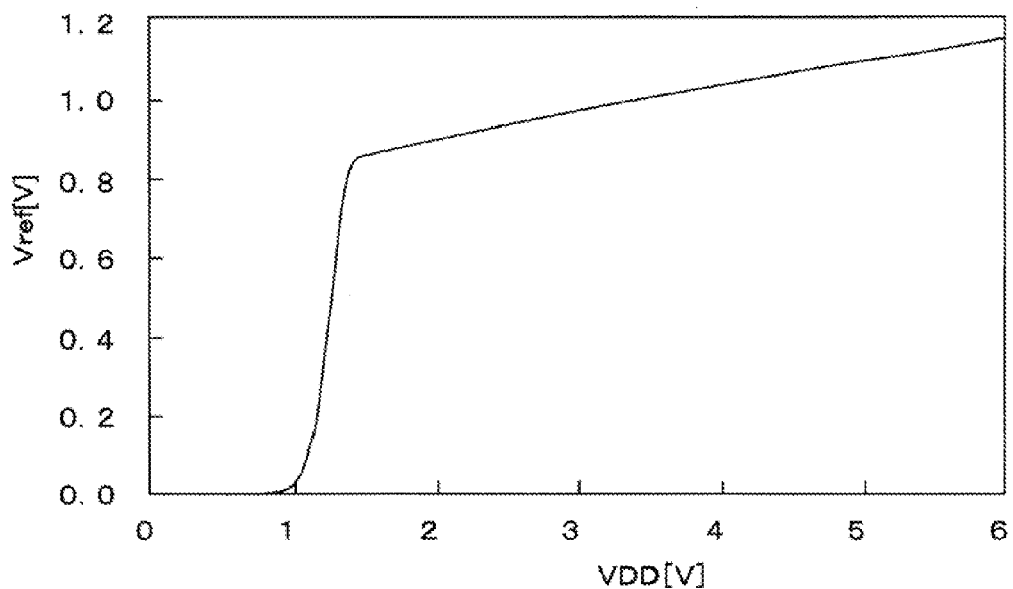
Figure 8B:
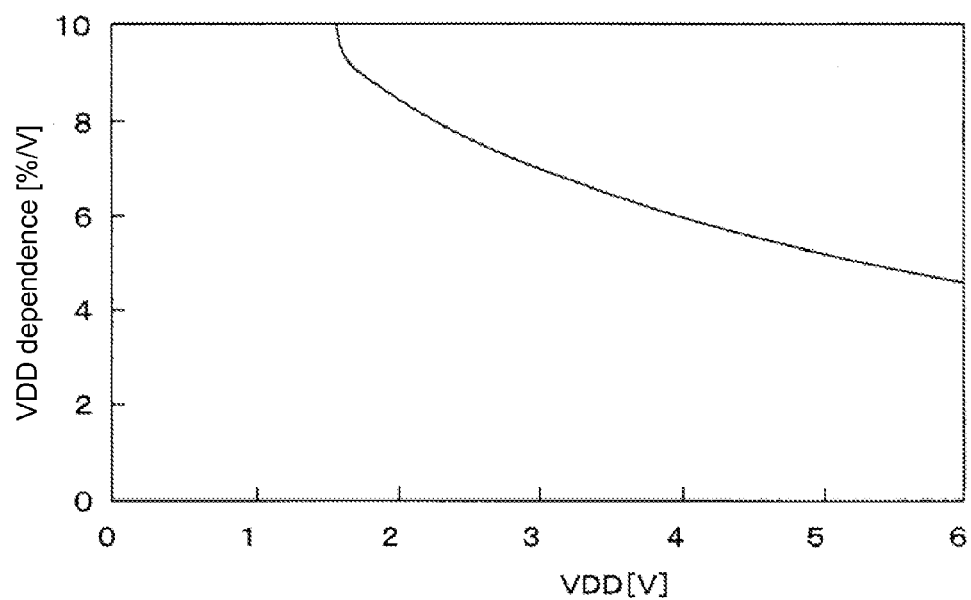
Figure 9A:
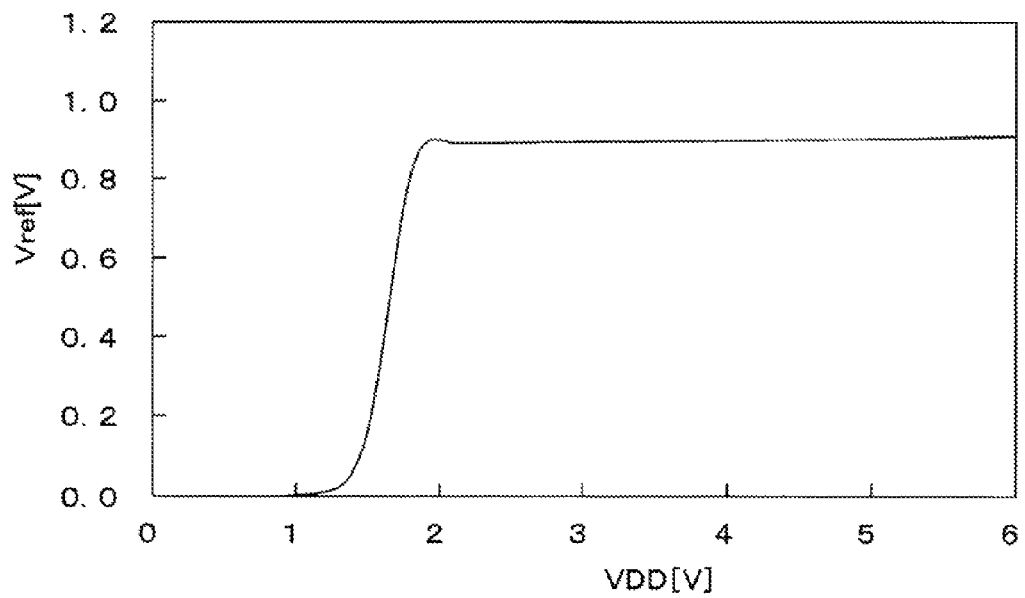
Figure 9B:
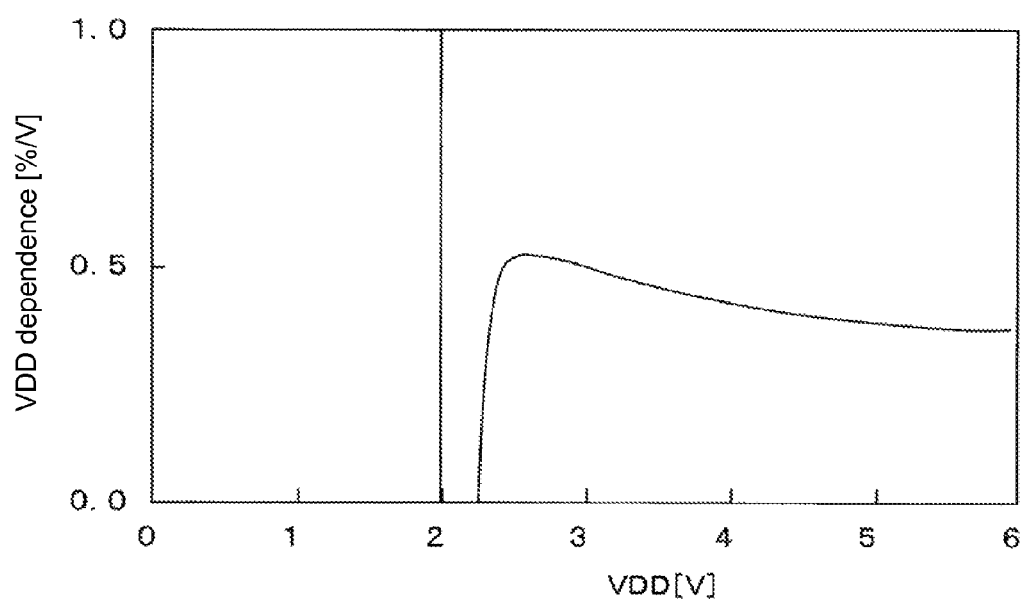

FIGS. 8(*a*) and 8(*b*) are graphs showing the power source voltage VDD dependence of the reference voltage Vref generated from the voltage generation circuit 60A of the comparative example shown in FIG. 5. FIGS. 9(*a*) and 9(*b*) are graphs showing the power source voltage VDD dependence of the reference voltage Vref generated from the voltage generation circuit 60 shown in FIG. 1 according to the first embodiment of the present invention.

In FIGS. 8(*a*) and 8(*b*) showing the characteristics of the reference voltage generation circuit 60A of the comparative example, FIG. 8(*a*) is a graph showing a relationship between the reference voltage Vref and the power source voltage VDD. In FIG. 8(*a*), the horizontal axis represents the power source voltage VDD, and the vertical axis represents the reference voltage Vref thus generated. As shown in FIG. 8(*a*), in the characteristics of the reference voltage generation circuit 60A of the comparative example, when the power source voltage VDD becomes about 1.2 V, the reference voltage Vref starts increasing. Further, the reference voltage Vref increases substantially linearly with the increase in the power source voltage VDD.

FIG. 8(*b*) is a graph corresponding to FIG. 8(*a*). In FIG. 8(*b*), the horizontal axis represents the power source voltage VDD, and the vertical axis represents a power source voltage VDD dependence coefficient (%/V). The power source voltage VDD dependence coefficient is converted from a change rate of the reference voltage Vref. As shown in FIG. 8(*b*), when the power source voltage VDD becomes about 5.0 V, the power source voltage VDD dependence coefficient of the reference voltage Vref reaches about 5%/V. Accordingly, when the power source voltage VDD fluctuates, the reference voltage Vref significantly fluctuates.

In FIGS. 9(*a*) and 9(*b*) showing the characteristics of the reference voltage generation circuit 60 in the first embodiment, FIG. 9(*a*) is a graph showing a relationship between the reference voltage Vref and the power source voltage VDD. In FIG. 9(*a*), the horizontal axis represents the power source voltage VDD, and the vertical axis represents the reference voltage Vref thus generated. As shown in FIG. 9(*a*), in the characteristics of the reference voltage generation circuit 60 in the first embodiment, when the power source voltage VDD becomes about 2.0 V, the reference voltage Vref starts increasing. However, even when the power source voltage VDD increases further, the reference voltage Vref is maintained at a substantially same level.

FIG. 9(*b*) is a graph corresponding to FIG. 9(*a*). In FIG. 9(*b*), the horizontal axis represents the power source voltage VDD, and the vertical axis represents a power source voltage VDD dependence coefficient (%/V). The power source voltage VDD dependence coefficient is converted from a change rate of the reference voltage Vref. As shown in FIG. 9(*b*), when the power source voltage VDD becomes about 5.0 V, the power source voltage VDD dependence coefficient of the reference voltage Vref reaches only about 0.4%/V. Accordingly, when the power source voltage VDD fluctuates, the reference voltage Vref only fluctuates to a negligibly minimum level.

As described above, in the first embodiment, the reference voltage generation circuit 60, the drive device, the print head 13, and the image forming apparatus 1 are capable of providing the following effects.

As described above, in the reference voltage generation circuit 60 in the first embodiment, the current-mirror circuit formed of the NMOS 61*c* and the NMOS 61*d* is disposed on the side of driving the collector currents of the NPN transistor 65 and the NPN transistor 66 as a source follower circuit, thereby compensating the low early voltage of the NPN transistor 65 and the NPN transistor 66 for detecting the temperature. Accordingly, even when the power source voltage VDD fluctuates, it is possible to minimize the variance in the collector currents of the NPN transistor 65 and the NPN transistor 66.

More specifically, in the reference voltage generation circuit 60 in the first embodiment, the current-mirror portion 61 includes the first current-mirror circuit and the second current-mirror circuit. The first current-mirror circuit is formed of the PMOS 61*a* and the PMOS 61*b*. The second current-mirror circuit is formed of the NMOS 61*c* and the NMOS 61*d*. The first current-mirror circuit is vertically connected to the second current-mirror circuit. Further, the current-mirror circuit portion 61 is provided for driving the NPN transistor 65 and the NPN transistor 66.

Accordingly, it is possible to make the potential of the node N3 substantially equal to the potential of the node N4. Accordingly, even when the value of the power source voltage VDD fluctuates, the base potential of the NPN transistor 65 does not fluctuate to a large extent. Further, the potential of the node N3 is substantially equal to the potential of the node N4. Accordingly, the collector potential of the NPN transistor 65 and the NPN transistor 66 does not fluctuate to a large extent as well. As a result, it is possible to reduce the variance in the reference voltage Vref to a negligibly minimum level.

As described above, in the reference voltage generation circuit 60 in the first embodiment, it is possible to obtain the temperature coefficient of +0.33%/° C. Accordingly, when the reference voltage generation circuit 60 is provided for temperature compensation of the drive device of the LED 201 formed of a material such as AlGaAs, it is possible to provide the drive device with good temperature characteristics. Further, even when the value of the power source voltage VDD fluctuates, it is possible to reduce the variance in the reference voltage Vref generated from the reference voltage generation circuit 60 to a negligibly minimum level.

Further, in the image forming apparatus 1 in the first embodiment, the print head 13 is provided with the reference voltage generation circuit 60. Accordingly, it is possible to provide the image forming apparatus 1 (such as a printer, a copier, a facsimile, a multi-function product, and the like) with high quality, high space efficiency, and high luminescence efficiency. Further, in addition to the image forming apparatus 1, when the print head 13 is disposed in a monochrome image forming apparatus or a multicolor image forming apparatus, it is possible to obtain a similar effect. Especially, when the print head 13 is a full color image forming apparatus, in which it is necessary to dispose a large number of the print heads 13 as the exposure device, it is possible to obtain a further significant effect.

Second Embodiment

Figure 10:
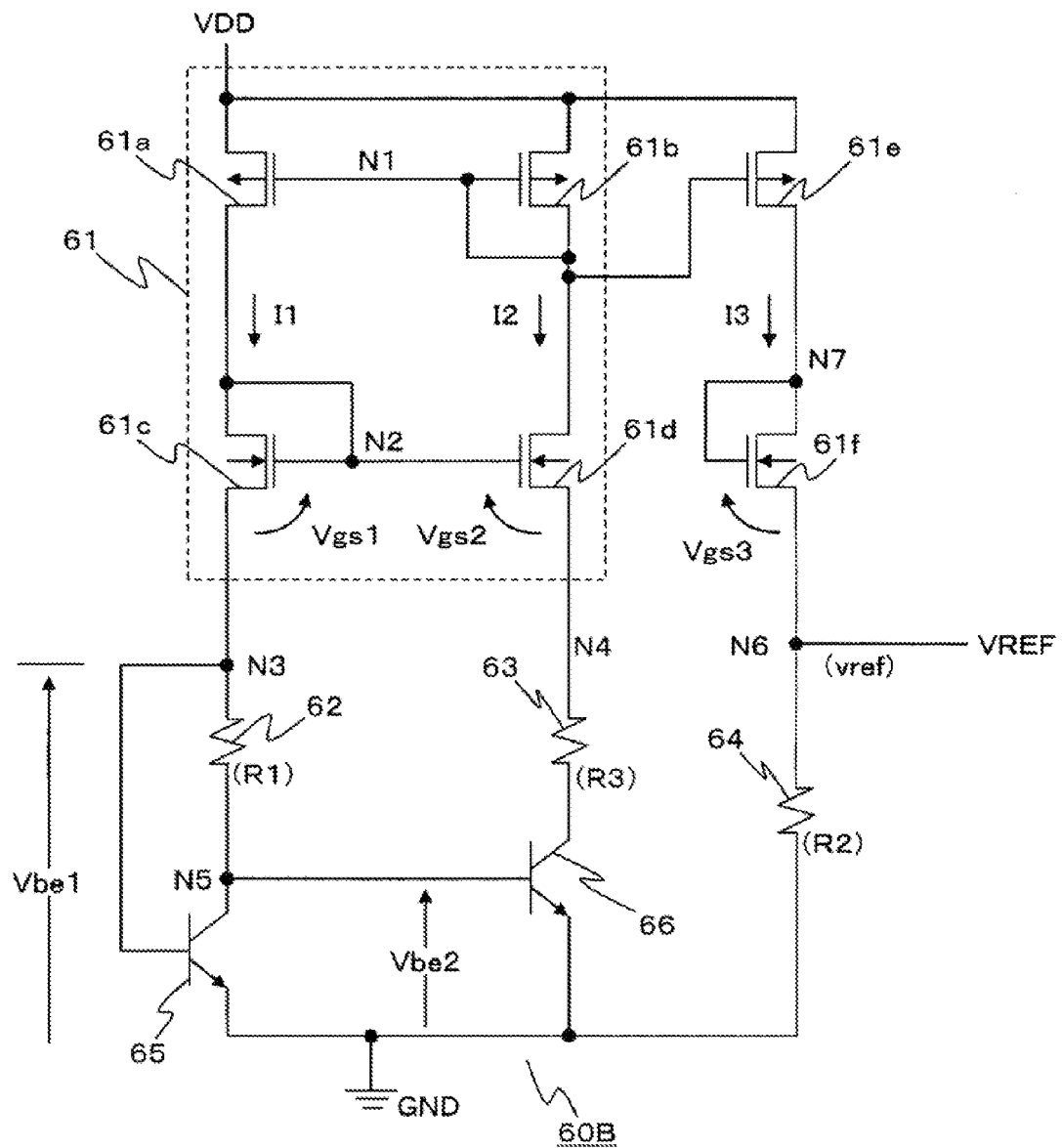
FIG. 10 is a circuit diagram showing a configuration of a reference voltage generation circuit according to a second embodiment of the present invention.

A second embodiment of the present invention will be explained next. It is possible to modify the reference voltage generation circuit 60 in the first embodiment through applying the similar technical concept. FIG. 10 is a circuit diagram showing a configuration of a reference voltage generation circuit 60B according to the second embodiment of the present invention. Components in the second embodiment similar to those in the first embodiment are designated with the same reference numerals.

As shown in FIG. 10, in the reference voltage generation circuit 60B in the second embodiment, a sixth MOS transistor of the second conductive type (for example, an NMOS 61f) is disposed through a diode connection between a node N7 on a side of the drain of the PMOS 61e and the node N6 on the side of the output terminal VREF. More specifically, a drain and a gate of the NMOS 61f are connected to the drain of the PMOS 61e through the node N7. A source of the NMOS 61f is connected to the output terminal VREF and the one end portion of the resistor 64 through the node N6. Accordingly, the NMOS 61f has a gate-source voltage Vgs3. Other configuration of the reference voltage generation circuit 60B is similar to that of the reference voltage generation circuit 60 in the first embodiment.

Similar to the first embodiment, the second resistor 63 is provided for making the collector potential of the NPN transistor 66 substantially equal to the collector potential of the NPN transistor 65. When it is not necessary to match an operation point of the NPN transistor 65 to that of the NPN transistor 66, the second resistor 63 may be omitted.

Similar to the first embodiment, in the reference voltage generation circuit 60B in the second embodiment, for a simple explanation, when the gates of the PMOSs 61a, 61b, and 61e have an identical width, the drain currents I1 to I3 thereof become identical. Accordingly, an output characteristic of the PMOSs 61a, 61b, and 61e becomes approximately the constant current characteristic. In order to improve the constant current characteristic, it is preferred that the PMOSs 61a, 61b, and 61e have a large gate length.

Similarly, when the gates of the NMOSs 61c and 61d have an identical length and an identical width, it is possible to match an operation state of the NMOS 61c to that of the NMOS 61d. As described above, the drain currents I1 to I3 of the PMOSs 61a, 61b, and 61e are identical. Accordingly, the drain currents of the NMOSs 61c, 61d, and 61f are identical, and the gate-source voltages Vgs1, Vgs2, and Vgs3 thereof are identical.

In the reference voltage generation circuit 60B in the second embodiment, it is possible to obtain an effect similar to that in the reference voltage generation circuit 60 in the first embodiment. Further, the drain of the NMOS 61f is connected to the gate thereof. Accordingly, the drain potential of the PMOS 61e connected to the node N7 on the side of the drain of the NMOS 61f is greater than the potential of the node N6 connected to the output terminal VREF by the gate-source voltage Vgs3. As a result, as compared with the reference voltage generation circuit 60 in the first embodiment without the NMOS 61f, the drain potential of the PMOS 61e becomes closer to the drain potential of the PMOS 61b. Accordingly, it is possible to match an operation state of the PMOS 61a to that of the PMOS 61b and the PMOS 61e, thereby making it possible to minimize a current variation between the drain currents I1, I2, and I3.

Third Embodiment

A third embodiment of the present invention will be explained next. In the third embodiment, the image forming apparatus 1 and the print head 13 have configurations similar to those of the image forming apparatus 1 and the print head 13 in the first embodiment. In the third embodiment, a reference voltage generation circuit 60C disposed in a drive device has a configuration different from the reference voltage generation circuit 60 in the first embodiment. Accordingly, the reference voltage generation circuit 60C will be explained.

Figure 11:
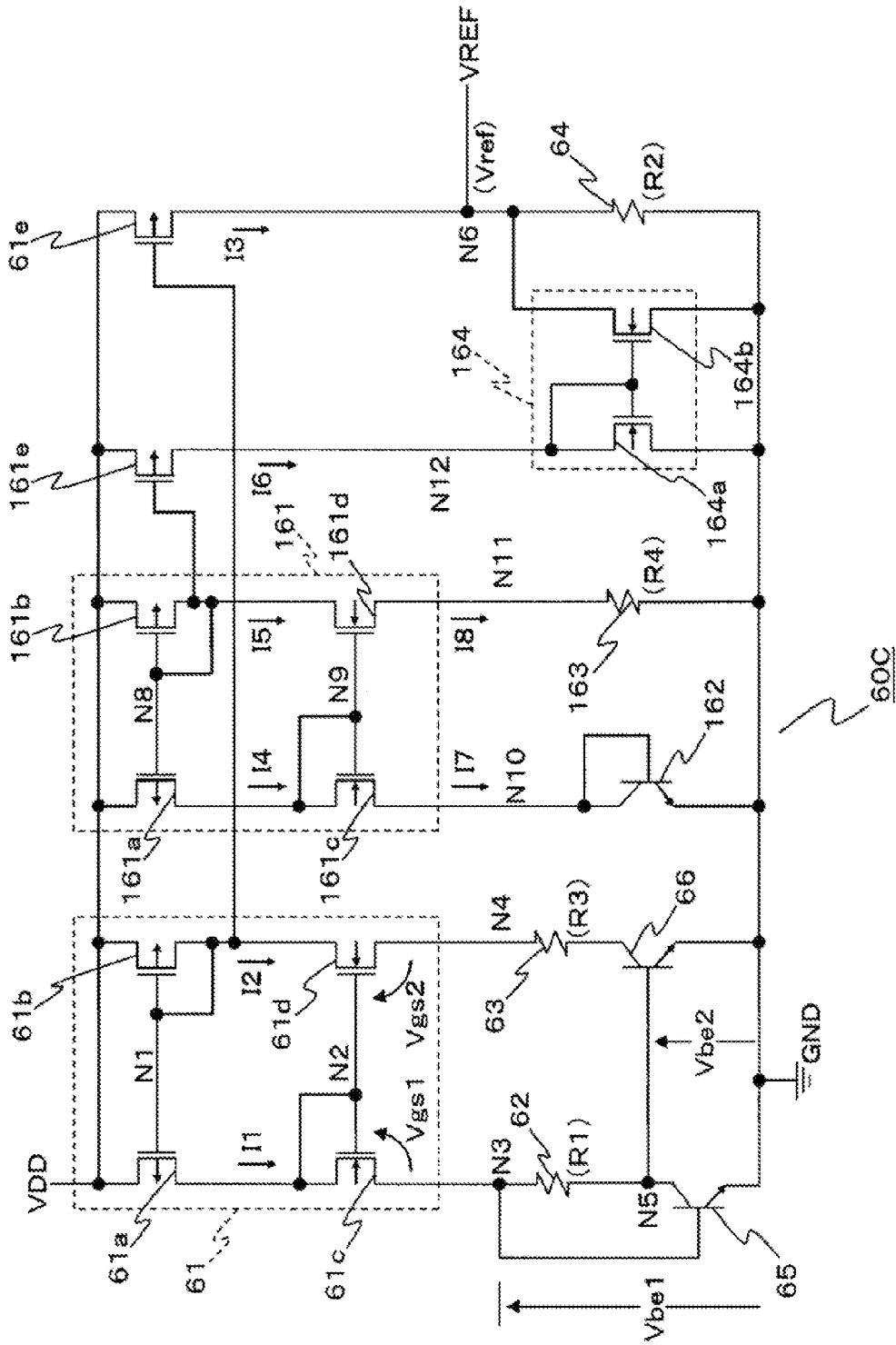
FIG. 11 is a circuit diagram showing a configuration of a reference voltage generation circuit according to a third embodiment of the present invention.

FIG. 11 is a circuit diagram showing a configuration of the reference voltage generation circuit 60C according to the third embodiment of the present invention. Components of the reference voltage generation circuit 60C similar to those of the reference voltage generation circuit 60 shown in FIG. 1 are designated with the same reference numerals.

In the second embodiment, the reference voltage generation circuit 60C is configured such that it is possible to set the temperature coefficient of the reference voltage Vref thus output at a greater level. More specifically, in addition to the configuration of the reference voltage generation circuit 60 in the first embodiment, the reference voltage generation circuit 60C further includes a current-mirror circuit portion 161; an eleventh MOS transistor of the first conductive type (for example, a PMOS 161e); a third bipolar transistor (for example, a NPNTR 162); a fourth resistor 163 with a resistivity R4; and a fifth current-mirror circuit 164. As shown in FIG. 11, the current-mirror circuit portion 161, the PMOS 161e, the NPNTR 162, the fourth resistor 163, and the fifth current-mirror circuit 164 are disposed between the current-mirror circuit portion 61, the first resistor 62, the second resistor 63, the NPN transistor 65, and the NPN transistor 66, and the PMOS 61e and the resistor 64.

In the embodiment, the current-mirror circuit portion 161 is connected between the power source VDD, and a third node N10 and a fourth node N11. Further, the current-mirror circuit portion 161 has a configuration and characteristics similar to those of the current-mirror circuit portion 61. More specifically, the current-mirror portion 161 includes a third current-mirror circuit and a fourth current-mirror circuit. The third current-mirror circuit is formed of a seventh MOS transistor of the first conductive type (for example, a PMOS 161a) and an eighth MOS transistor of the first conductive type (for example, a PMOS 161b). The fourth current-mirror circuit is formed of a ninth MOS transistor of the second conductive type (for example, an NMOS 161c) and a tenth MOS transistor of the second conductive type (for example, an NMOS 161d). The third current-mirror circuit is vertically connected to the fourth current-mirror circuit.

In the embodiment, a source of the PMOS 161a of the third current-mirror circuit is connected to the power source VDD, and a gate of the PMOS 161a is connected to a gate of the PMOS 161b through a node N8. Accordingly, the PMOS 161a is configured such that a drain current I4 flows between the source and a drain thereof. Further, a source of the PMOS 161b of the third current-mirror circuit is connected to the power source VDD, and a drain of the PMOS 161b is connected to the gate thereof. Accordingly, the PMOS 161b is configured to operate in a saturated state, and a drain current I5 thereof flows between the source and the drain thereof.

In the embodiment, a drain and a gate of the NMOS 161c of the fourth current-mirror circuit are connected to the drain of the PMOS 161a, and a source of the NMOS 161c is connected to a node N10 corresponding to a control side terminal of the current-mirror circuit portion 161. Accordingly, the NMOS 161c is configured such that a source current I7 flows through the node N10. Further, a drain of the NMOS 161d of the fourth current-mirror circuit is connected to the drain of the PMOS 161b, a gate of the NMOS 161d is connected to the gate of the NMOS 161c through a node N9, and a source of the NMOS 161d is connected to a second node N11 corresponding to a follower side terminal of the current-mirror circuit portion 161. Accordingly, the NMOS 161d is configured such that a source current I8 flows through the node N11.

In the embodiment, a collector of the NPNTR 162 is connected to a base thereof, and an emitter of the NPNTR 162 is connected to the ground GND. The node N11 is connected to the ground GND through the fourth resistor 163 with the resistivity R4.

In the embodiment, the drain of the PMOS 161b is connected to a drain of the PMOS 161e. A source of the PMOS 161e is connected to the power source VDD, and a drain of the PMOS 161e is connected to a fifth node N12 on a control side. Accordingly, the PMOS 161e is configured such that a drain current I6 flows through the fifth node N12. The PMOSs 161a, 161b, and 161e are configured to have a substantially identical gate length. Further, the sources of the PMOSs 161a, 161b, and 161e are connected to the gates thereof to have a substantially identical voltage between the gates and the sources, so that the PMOSs 161a, 161b, and 161e are in a current-mirror relationship.

As shown in FIG. 11, the reference voltage generation circuit 60C includes the fifth current-mirror circuit 164 disposed between the node N12 on the control side and the node N6 on the follower side, and the ground GND. The fifth current-mirror circuit 164 is formed of a twelfth MOS transistor of the second conductive type (for example, an NMOS 164a) and a thirteenth MOS transistor of the second conductive type (for example, an NMOS 164b).

In the embodiment, a drain and a gate of the fifth current-mirror circuit 164a of the fifth current-mirror circuit 164 are connected to the drain of the PMOS 161e, and a source of the fifth current-mirror circuit 164a is connected to the ground GND. Further, a drain of the fifth current-mirror circuit 164b of the fifth current-mirror circuit 164 is connected to the output terminal VREF through the node N6 on the follower side, and the drain of the PMOS 61e. A gate of the fifth current-mirror circuit 164b is connected to the gate of the PMOS 161a, and a source of the fifth current-mirror circuit 164b is connected to the ground GND.

Other configurations of the reference voltage generation circuit 60C are similar to those of the reference voltage generation circuit 60 in the first embodiment. As described above, the second resistor 63 is provided for making the collector potential of the NPN transistor 66 substantially equal to the collector potential of the NPN transistor 65. When it is not necessary to match the operation point of the NPN transistor 65 to that of the NPN transistor 66, the second resistor 63 may be omitted.

For a simple explanation, in the current-mirror circuit portion 161, when the gates of the PMOSs 161a, 161b, and 161e have an identical width, the drain currents I4 to I6 thereof become identical. Accordingly, an output characteristic of the PMOSs 161a, 161b, and 161e becomes approximately a constant current characteristic. In order to improve the constant current characteristic, it is preferred that the PMOSs 161a, 161b, and 161e have a large gate length.

Similarly, when the gates of the NMOSs 161c and 161d have an identical length and an identical width, it is possible to match an operation state of the NMOS 161c to that of the NMOS 161d. As described above, the drain current I4 is equal to the drain current I5. Accordingly, the drain currents of the NMOSs 161c and 161d are identical, and the gate-source voltages thereof are identical. Further, the drain current I4 of the PMOS 161a is equal to the source current I7 of the NMOS 161c, and the drain current I5 of the PMOS 161b is equal to the source current I8 of the NMOS 161d. Accordingly, the source current I7 is equal to the source current I8.

As explained in the first embodiment, on the side of the current-mirror circuit portion 61, the potential of the node N3 is substantially equal to that of the node N4. Similarly, on the side of the current-mirror circuit portion 161, the potential of the node N10 is substantially equal to that of the node N11. The potential of the node N10 is equal to the base-emitter voltage Vbe of the NPNTR 162, and the node N11 is connected to one end portion of the fourth resistor 163 with the resistivity R4. Accordingly, the source current I8 of the NMOS 161d is given by the following equation:

$$I8 = Vbe/R4$$

As well known in the art, for example, the base-emitter voltage Vbe of the NPNTR 162 formed of a silicon material is typically about 0.6 V, and has a temperature dependence of –2 mV/° C. Accordingly, the temperature coefficient Tc of the base-emitter voltage Vbe is given by the following calculation:

$$Tc = -2 \times 10^{-3}/0.6 = -0.33(\%/° C.)$$

When the temperature coefficient of the fourth resistor 163 with the resistivity R4 is negligible, the temperature coefficient of the source currents I7 and I8 also becomes –0.33%/° C.

As explained above, the currents I4 to I8 are identical, so that the temperature coefficient of the drain current I6 of the PMOS 161e also becomes –0.33%/° C. The drain current I6 flows into the node N12 of the fifth current-mirror circuit 164 formed of the fifth current-mirror circuit 164a and the fifth current-mirror circuit 164b. Accordingly, a flow-in current inversely proportional to the drain current I6 is generated in the node N6 on the follower side of the fifth current-mirror circuit 164. It is possible to arbitrarily set a ratio of currents flowing into the node N12 on the control side and the node N6 on the follower side of the fifth current-mirror circuit 164 through adjusting a size ratio of the fifth current-mirror circuit 164a and the fifth current-mirror circuit 164b.

An operation of the reference voltage generation circuit 60C shown in FIG. 11 will be explained. FIGS. 12(a) to 12(d) are a circuit diagram and graphs showing the operation of the reference voltage generation circuit 60C according to the third embodiment of the present invention.

More specifically, FIG. 12 (a) is a circuit diagram showing a surrounding portion of the current-mirror circuit 164 of the reference voltage generation circuit 60C shown in FIG. 11. FIG. 12(b) is a graph showing a relationship between a temperature and the current I3 flowing in the surrounding portion of the current-mirror circuit 164, FIG. 12(c) is a graph showing a relationship between a temperature and a current I3B flowing in the surrounding portion of the current-mirror circuit 164, and FIG. 12(d) is a graph showing a relationship between a temperature and a current I3A flowing in the surrounding portion of the current-mirror circuit 164.

As shown in FIG. 12(a), the PMOS 61e and the PMOS 161e have the drain currents I3 and I6, respectively. The current I3A flows in the resistor 64 with the resistivity R2, and the current I3B flows in the drain of the fifth current-mirror circuit 164b.

FIGS. 12(b) to 12(d) are the graphs showing changes in the currents I3, I3B, and I3A with the temperature. In FIG. 12(b), as explained above, the current I3 has the characteristic proportional to the absolute temperature (T), and has the temperature coefficient of about 0.33%/° C. Further, as explained above, the drain current I6 of the PMOS 161*e* has the characteristic decreasing with an increase in the temperature, and has the temperature coefficient of about −0.33%/° C. The drain current I6 and the current I3B are in the current-mirror relationship. Accordingly, the current I3B also has the characteristic decreasing with an increase in the temperature, and has the temperature coefficient of about −0.33%/° C.

In FIG. 12(*a*), the current I3 is equal to a sum of the current I3A and the current I3B (I3=I3A+I3B). Accordingly, the current I3A is equal to a difference between the current I3 and the current I3B (I3A=I3−I3B). As a result, the characteristic line of the current I3A in FIG. 12(*d*) corresponds to a difference between the current I3 shown in FIG. 12(*b*) and the current I3B shown in FIG. 12(*c*). In other words, the characteristic line of the current I3A in FIG. 12(*d*) has the temperature dependence greater than those of the current I3 shown in FIG. 12(*b*) and the current I3B shown in FIG. 12(*c*).

The property described above will be explained quantitatively in more detail. For the simple explanation, the current I3 is represented with I; the current I3A is represented with Ia; and the current I3B is represented with Ib. Further, the temperature coefficient of the current I is represented with αq; the temperature coefficient of the current Ib is represented with αc; the temperature coefficient of the current Ia is represented with Tc. Accordingly, the following equation (10) is established:

$$\alpha P = \frac{1}{I} \times \frac{\partial I}{\partial T} \quad (10)$$
$$\alpha c = \frac{1}{Ib} \times \frac{\partial Ib}{\partial T}$$

Accordingly, the following equation (11) is established:

$$\frac{\partial I}{\partial T} = I \times \alpha P \quad (11)$$
$$\frac{\partial Ib}{\partial T} = Ib \times \alpha c$$

As described above, the current Ia is given by the following equation (12):

$$Ia = I - Ib \quad (12)$$

Accordingly, the temperature coefficient Tc of the current Ia is given by the following equation (13):

$$Tc = \frac{1}{Ia} \times \frac{\partial Ia}{\partial T} \quad (13)$$
$$= \frac{1}{I - Ib} \times \frac{\partial}{\partial T}(I - Ib)$$

When the equation (13) is reorganized, the following equation (14) is obtained:

$$Tc = \frac{1}{\left(1 - \frac{Lb}{I}\right)} \times \left(\alpha p - \frac{Ib}{I}\alpha c\right) \quad (14)$$

As described above, the temperature coefficient αq of the current I3 is about 0.33%/° C., and the temperature coefficient αc of the current I3B is about −0.33%/° C. Accordingly, the following equation (15) is established:

$$\alpha q = -\alpha c \quad (15)$$

Accordingly, when the equation (14) is reorganized using the equation (15), the following equation (16) is established:

$$Tc = \frac{1 + \frac{Ib}{I}}{1 - \frac{Lb}{I}} \times \alpha p \quad (16)$$

In the equation (16), the temperature coefficient αq is determined in advance. Accordingly, it is possible to change the temperature coefficient Tc of the current I through adjusting a ratio between the current Ib and the current I.

Figure 13A:
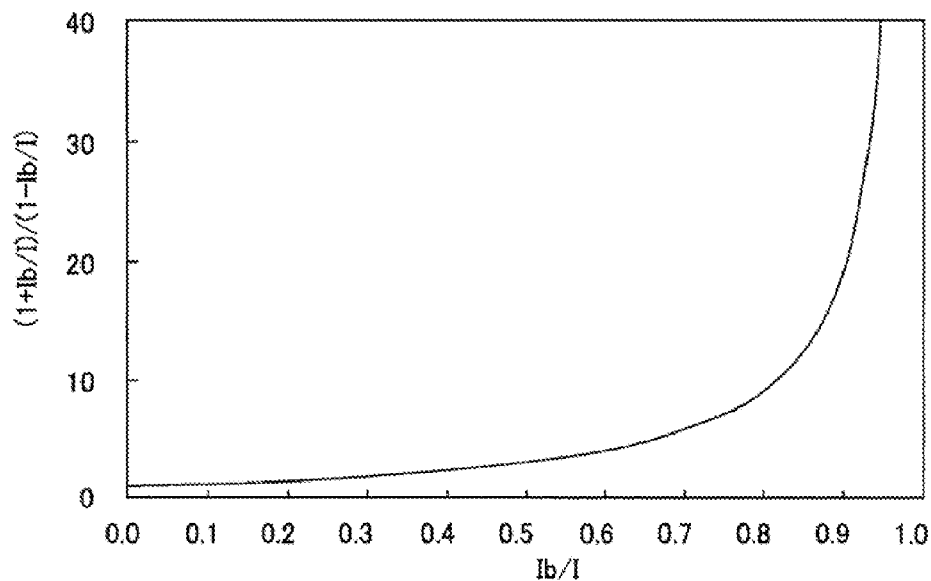
Figure 13B:
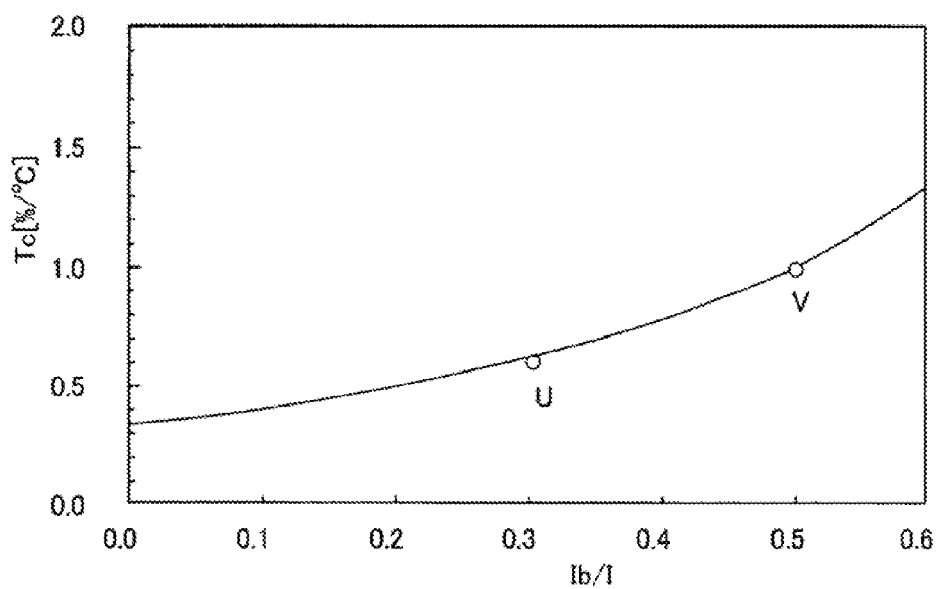

FIGS. 13(*a*) and 13(*b*) are graphs showing characteristics of the voltage generation circuit 60C according to the third embodiment of the present invention. More specifically, FIG. 13(*a*) is a graph No. 1 showing a relationship between the temperature coefficient αq and the current, and FIG. 13(*b*) is a graph No. 2 showing the relationship between the temperature coefficient αq and the current.

In FIG. 13(*a*), the vertical axis represents a proportional term (1+Ib/I)/(1−Ib/I) of the temperature coefficient αq, and the horizontal axis represents the ratio of the currents Ib/I. In FIG. 13(*b*), the vertical axis represents the temperature coefficient Tc obtained by substituting the temperature coefficient αq with an actual specific value 0.33%/° C., and the horizontal axis represents the ratio of the currents Ib/I.

As shown in FIGS. 13(*a*) and 13(*b*), when the ratio of the currents Ib/I increases, a graph curve increases. As shown at a point U in FIG. 13(*b*), when the ratio of the currents Ib/I, that is the ratio of the current I3B and the current I3, becomes 0.3, the temperature coefficient Tc of the current I3A becomes about 0.6%/° C. Further, as shown at a point V in FIG. 13(*b*), when the ratio of the currents Ib/I, that is the ratio of the current I3B and the current I3, becomes 0.5, the temperature coefficient Tc of the current I3A becomes about 1.0%/° C.

As described above, when the LED 201 is formed of a material such as GaAs, the temperature coefficient of the drive current becomes about 0.6%/° C. in order to compensate the temperature characteristic of the LED 201. When the LED 201 is formed of a material such as AlGaInP, the temperature coefficient of the drive current becomes about 1.0%/° C. in order to compensate the temperature characteristic of the LED 201.

As shown in FIG. 13(*b*), when the ratio of the currents Ib/I is set at the point U or V, it is possible to obtain the temperature coefficient Tc matching to the temperature coefficient of the material of the LED 201.

As described above, in the reference voltage generation circuit 60C in the third embodiment, it is possible to increase the temperature coefficient further than the first embodiment. More specifically, as indicated with the following equation (17), the current I3B with the negative temperature coefficient is subtracted from the current I3 with the positive temperature coefficient to generate the current I3A. Accordingly, it is possible to increase the temperature coefficient.

$$I3A = I3 - I3B \quad (17)$$

In the embodiment, while the current I3A has the temperature coefficient greater than that of the current I3, the absolute value of the current I3A is smaller than that of the current I3.

However, according to the decrease in the absolute value of the current I3A, when the resistivity R2 of the resistor 64 increases, it is possible to easily set the reference voltage Vref at a specific level.

As described above, in the reference voltage generation circuit 60C in the third embodiment, in addition to the configuration of the reference voltage generation circuit 60 in the first embodiment, the current-mirror circuit portion 161 and the fifth current-mirror circuit 164 with the configurations similar to those in the first embodiment are provided.

Accordingly, the reference voltage generation circuit 60C generates the reference current I3B inversely proportional to the base-emitter voltage of the NPN transistor 65 and the NPN transistor 66. Further, the reference current I3B is subtracted from the reference current I3 obtained from the configuration in the first embodiment, thereby generating the reference current I3A with the large temperature coefficient. According to the reference current I3A, it is possible to generate the reference voltage Vref at the specific level. Accordingly, it is possible to set the temperature coefficient of the reference voltage generation circuit 60C according to the temperature coefficient of the LED 201, and to freely set the reference voltage Vref.

More specifically, in the reference voltage generation circuit 60C in the third embodiment, it is possible to freely set the temperature coefficient of the reference voltage Vref output from the output terminal VREF thereof. Further, it is possible to freely set the reference voltage Vref at the specific level independent from the temperature coefficient thereof.

Further, in the second embodiment, similar to the first embodiment, even when the value of the power source voltage VDD fluctuates, it is possible to reduce the variance in the reference voltage Vref generated from the reference voltage generation circuit 60 to a negligibly minimum level. Accordingly, it is possible to apply the reference voltage generation circuit 60C to various LEDs and drives device thereof.

Fourth Embodiment

Figure 14:
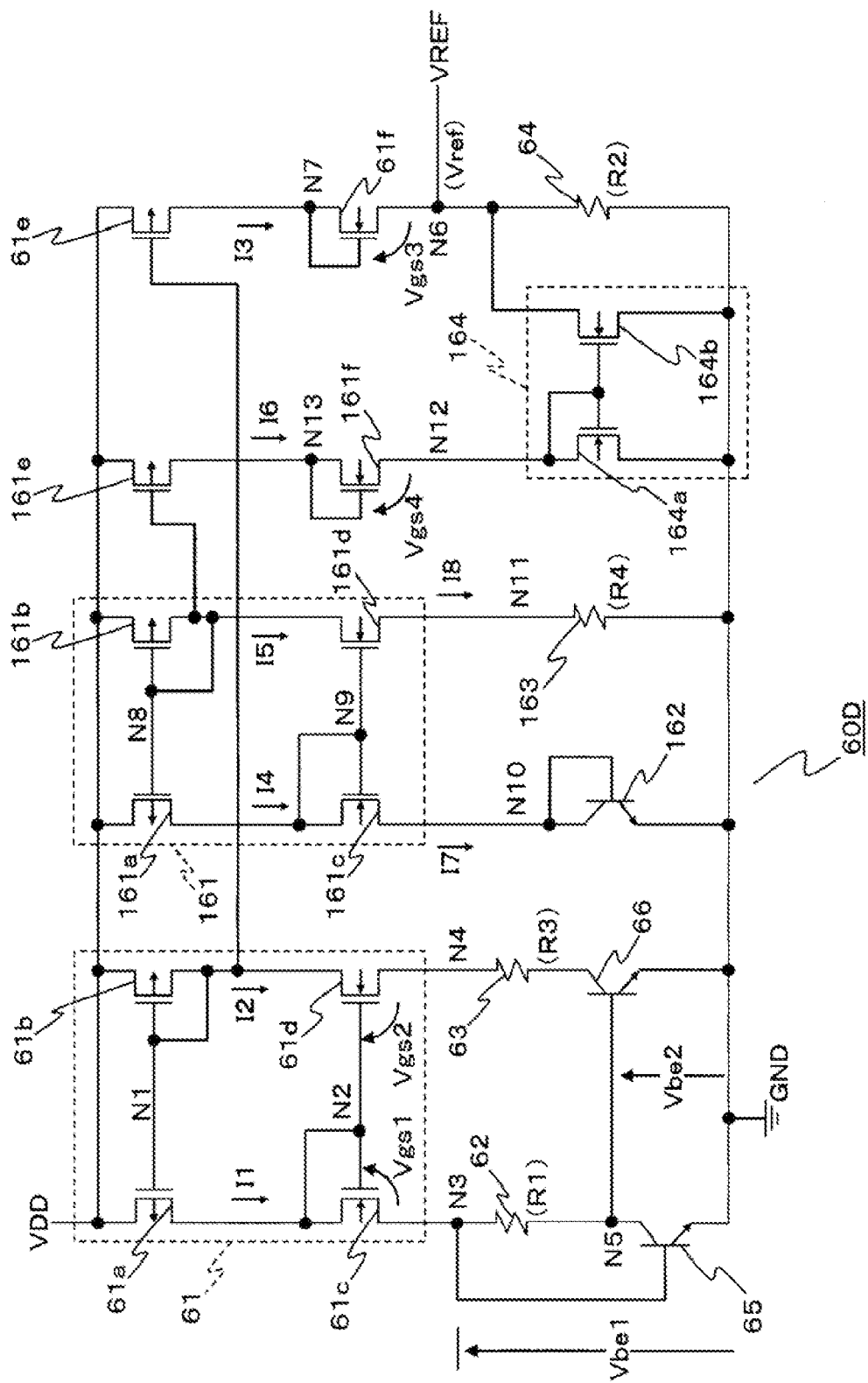
FIG. 14 is a circuit diagram showing a configuration of a reference voltage generation circuit according to a fourth embodiment of the present invention.

A fourth embodiment of the present invention will be explained next. It is possible to modify the reference voltage generation circuit 60C in the third embodiment through applying the similar technical concept. FIG. 14 is a circuit diagram showing a configuration of a reference voltage generation circuit 60D according to the fourth embodiment of the present invention. Components in the fourth embodiment similar to those in the third embodiment are designated with the same reference numerals.

As shown in FIG. 14, in the reference voltage generation circuit 60D in the fourth embodiment, a fourteenth MOS transistor of the second conductive type (for example, an NMOS 61f) is disposed through a diode connection between the node N7 on a side of the drain of the PMOS 61e and the node N6 on the side of the output terminal VREF. Further, a fifteenth MOS transistor of the second conductive type (for example, an NMOS 161f) is disposed through a diode connection between a node N13 on a side of the drain of the PMOS 161e and the fifth node N12 on the side of the drain of the fifth current-mirror circuit 164a. Accordingly, it is possible to minimize a difference in the operational points relative to the PMOS 61b and the PMOS 161b.

More specifically, the drain and the gate of the NMOS 61f are connected to the drain of the PMOS 61e through the node N7. The source of the NMOS 61f is connected to the output terminal VREF and the one end portion of the resistor 64 through the node N6. Accordingly, the NMOS 61f has the gate-source voltage Vgs3. Further, the drain and the gate of the NMOS 161f are connected to the drain of the PMOS 161e through the node N13. The source of the NMOS 161f is connected to the drain and the gate of the fifth current-mirror circuit 164a and the gate of the resistor 64 through the fifth current-mirror circuit 164b. Accordingly, the NMOS 161f has the gate-source voltage Vgs4. Other configuration of the reference voltage generation circuit 60D is similar to that of the reference voltage generation circuit 60C in the third embodiment.

In the reference voltage generation circuit 60D in the fourth embodiment, it is possible to obtain an effect similar to that in the reference voltage generation circuit 60C in the third embodiment. More specifically, the potential of the node N13 on the side of the drain and the gate of the NMOS 161f is greater than the potential of the node N12 on the side of the source of the NMOS 161f by the gate-source voltage Vgs4. Further, the potential of the node N7 on the side of the drain and the gate of the NMOS 61f is greater than the potential of the node N6 on the side of the source of the NMOS 61f by the gate-source voltage Vgs3. As a result, it is possible to set the potential close to those of the POMS 61b and the PMOS 161b. Accordingly, it is possible to match the drain potential and the operation state of the PMOS 61a, the PMOS 61b, the PMOS 61e, the PMOS 161a, the PMOS 161b, and the PMOS 161e, thereby making it possible to minimize a current variation between the drain currents I1, I2, I3, I4, I5, and I6.

It is noted that the present invention is not limited to the embodiments described above, and may be modified as follows.

In the configurations shown in FIGS. 1, 6, 10, 11, and 14, even when the polarity of the MOS transistors or the bipolar transistors constituting the circuits is changed, or the polarity of the power source is changed, it is possible to obtain the similar effect. More specifically, the PMOS may be changed to NMOS, or the NOMS may be changed to the PMOS. Further, the NPNTR may be changed to the PNP transistor (PNPTR), or the first power source may be changed to the ground GND and the second power source may be changed to the power source VDD according to the change in the transistors.

In the embodiments described above, the present invention is applied to the LED 201 as the light source, and may be applicable to other driven elements such as a light emitting thyristor and a light emitting transistor. The present invention may be effectively applied to a device for controlling a voltage applied to an organic EL element or a heating resistor.

For example, the present invention is applicable to a printer including an organic EL head formed of an array of organic EL elements, or a thermal printer including an array of heating resistors. Further, the present invention is applicable for controlling a voltage applied to a display device (for example, a display element arranged in a row or a matrix pattern).

Further, the present invention is applicable for driving a four-terminal thyristor SCS (Semiconductor Controlled Switch) having a first gate and a second gate, in addition to a thyristor having a three-terminal structure.

The disclosure of Japanese Patent Application No. 2010-100209, filed on Apr. 23, 2010, is incorporated in the application by reference.

While the invention has been explained with reference to the specific embodiments of the invention, the explanation is illustrative and the invention is limited only by the appended claims.

What is claimed is:

1. A reference voltage generation circuit comprising:
    a first current-mirror circuit including a first MOS transistor of a first conductive type connected to a first power source and a second MOS transistor of the first conductive type connected to the first power source;

a second current-mirror circuit including a third MOS transistor of a second conductive type and a fourth MOS transistor of the second conductive type, said second current-mirror circuit being disposed between the first current-mirror circuit, and a first node and a second node, and being vertically connected to the first current-mirror circuit;

a first resistor having one end portion connected to the first node;

a first bipolar transistor having a collector connected to the other end portion of the first resistor, an emitter connected to a second power source having a potential different from that of the first power source, and a base connected to the first node;

a second bipolar transistor having a collector directly connected to the second node or connected to the second node through a second resistor, an emitter connected to the second power source, and a base connected to the collector of the first bipolar transistor;

a fifth MOS transistor connected between the first power source and an output terminal for outputting a reference voltage so that a conductive state of the fifth MOS transistor is controlled according to an output voltage of the first current-mirror circuit;

a third resistor connected in series between the output terminal and the second power source;

a third current-mirror circuit including a seventh MOS transistor of the first conductive type connected to the first power source and an eighth MOS transistor of the first conductive type connected to the first power source;

a fourth current-mirror circuit including a ninth MOS transistor of the second conductive type and a tenth MOS transistor of the second conductive type, said second current-mirror circuit being disposed between the third current-mirror circuit, and a third node and a fourth node, and being vertically connected to the third current-mirror circuit;

a third bipolar transistor having a collector and a base connected to the third node and an emitter connected to the second power source;

a fourth resistor connected in series between the fourth node and the second power source;

an eleventh MOS transistor connected between the first power source and a fifth node so that a conductive state of the eleventh MOS transistor is controlled according to an output voltage of the third current-mirror circuit; and a fifth current-mirror circuit including a twelfth MOS transistor of the second conductive disposed between the fifth node and the out terminal and connected in series to the eleventh MOS transistor, and a thirteenth MOS transistor of the second conductive type connected in parallel to the third resistor.

2. The reference voltage generation circuit according to claim 1, further comprising a sixth MOS transistor of the second conductive type connected between the fifth MOS transistor and the output terminal through a diode connection.

3. A drive device comprising the reference voltage generation circuit according to claim 1, further comprising:

a control voltage generation circuit for receiving a reference voltage output from the reference voltage generation circuit to generate a control voltage according to the reference voltage;

a logic circuit having a power source terminal for receiving a power source voltage output from the first power source, and a ground terminal for receiving the control voltage, said logic circuit being provided for receiving a strobe signal and data so that the logic circuit controls output of the data according to the strobe signal, and outputs a voltage with a high level substantially equal to the power source voltage or a voltage with a low level substantially equal to the control voltage; and a drive circuit for receiving the power source voltage, and supplying a drive current to a driven element according to an output voltage of the logic circuit.

4. A print head comprising the drive device according to claim 3 and a light emitting element array for emitting light according to the drive current, said light emitting element array including a plurality of light emitting elements arranged as the driven element.

5. An image forming apparatus comprising the print head according to claim 4 so that the print head exposes to form an image on a recording medium.

6. A reference voltage generation circuit comprising, a first current-mirror circuit including a first MOS transistor of a first conductive type connected to a first power source and a second MOS transistor of the first conductive type connected to the first power source;

a second current-mirror circuit including a third MOS transistor of a second conductive type and a fourth MOS transistor of the second conductive type, said second current-mirror circuit being disposed between the first current-mirror circuit, and a first node and a second node, and being vertically connected to the first current-mirror circuit;

a first resistor having one end portion connected to the first node;

a first bipolar transistor having a collector connected to the other end portion of the first resistor, an emitter connected to a second power source having a potential different from that of the first power source, and a base connected to the first node;

a second bipolar transistor having a collector directly connected to the second node or connected to the second node through a second resistor, an emitter connected to the second power source, and a base connected to the collector of the first bipolar transistor;

a fifth MOS transistor connected between the first power source and an output terminal for outputting a reference voltage so that a conductive state of the fifth MOS transistor is controlled according to an output voltage of the first current-mirror circuit;

a third resistor connected in series between the output terminal and the second power source;

a third current-mirror circuit including a seventh MOS transistor of the first conductive type connected to the first power source and an eighth MOS transistor of the first conductive type connected to the first power source;

a fourth current-mirror circuit including a ninth MOS transistor of the second conductive type and a tenth MOS transistor of the second conductive type, said second current-mirror circuit being disposed between the third current-mirror circuit, and a third node and a fourth node, and being vertically connected to the third current-mirror circuit;

a third bipolar transistor having a collector and a base connected to the third node and an emitter connected to the second power source;

a fourth resistor connected in series between the fourth node and the second power source;

an eleventh MOS transistor connected between the first power source and a fifth node so that a conductive state of the eleventh MOS transistor is controlled according to an output voltage of the third current-mirror circuit;

a fifth current-mirror circuit including a twelfth MOS transistor of the second conductive type disposed between the fifth node and the output terminal and connected in series to the eleventh MOS transistor, and a thirteenth MOS transistor of the second conductive type connected in parallel to the third resistor; and a fourteenth MOS transistor connected between the fifth MOS transistor and the output terminal through a diode connection, and a fifteenth MOS transistor connected between the eleventh MOS transistor and the fifth node through a diode connection.

7. A drive device comprising the reference voltage generation circuit according to claim 6, further comprising:

a control voltage generation circuit for receiving a reference voltage output from the reference voltage generation circuit to generate a control voltage according to the reference voltage;

a logic circuit having a power source terminal for receiving a power source voltage output from the first power source, and a ground terminal for receiving the control voltage, said logic circuit being provided for receiving a strobe signal and data so that the logic circuit controls output of the data according to the strobe signal, and outputs a voltage with a high level substantially equal to the power source voltage or a voltage with a low level substantially equal to the control voltage; and a drive circuit for receiving the power source voltage, and supplying a drive current to a driven element according to an output voltage of the logic circuit.

8. A print head comprising the drive device according to claim 7 and a light emitting element array for emitting light according to the drive current, said light emitting element array including a plurality of light emitting elements arranged as the driven element.

9. An image forming apparatus comprising the print head according to claim 8 so that the print head exposes to form an image on a recording medium.

* * * * *